United States Patent
Park

(10) Patent No.: US 8,522,157 B2
(45) Date of Patent: Aug. 27, 2013

(54) TERMINAL, CONTROLLING METHOD THEREOF AND RECORDABLE MEDIUM THEREOF

(75) Inventor: Jae Pil Park, Seoul (KR)

(73) Assignee: LG Electronics Inc., Seoul (KR)

( * ) Notice: Subject to any disclaimer, the term of this patent is extended or adjusted under 35 U.S.C. 154(b) by 367 days.

(21) Appl. No.: 12/422,933

(22) Filed: Apr. 13, 2009

(65) Prior Publication Data

US 2010/0056221 A1 Mar. 4, 2010

(30) Foreign Application Priority Data

Sep. 3, 2008 (KR) ........................ 10-2008-0086695

(51) Int. Cl.
*G06F 3/048* (2006.01)

(52) U.S. Cl.
USPC ........................... 715/786; 715/784; 715/758

(58) Field of Classification Search
USPC .................................................. 715/784–786
See application file for complete search history.

(56) References Cited

U.S. PATENT DOCUMENTS

| | | | | |
|---|---|---|---|---|
| 5,528,259 A * | 6/1996 | Bates et al. | .................... | 345/676 |
| 5,623,588 A | 4/1997 | Gould | | |
| 5,943,052 A * | 8/1999 | Allen et al. | .................... | 715/787 |
| 6,335,730 B1 * | 1/2002 | Gould | .......................... | 715/784 |
| 6,489,951 B1 * | 12/2002 | Wong et al. | .................... | 345/173 |
| 7,263,380 B2 * | 8/2007 | Foxenland | ................. | 455/550.1 |
| 2003/0157970 A1 | 8/2003 | Kraft et al. | | |
| 2006/0120464 A1 | 6/2006 | Hannuksela | | |
| 2007/0192744 A1 * | 8/2007 | Reponen | ....................... | 715/833 |
| 2007/0236477 A1 | 10/2007 | Ryu et al. | | |
| 2008/0034316 A1 * | 2/2008 | Thoresson | ..................... | 715/781 |
| 2008/0122796 A1 * | 5/2008 | Jobs et al. | ..................... | 345/173 |
| 2008/0165141 A1 * | 7/2008 | Christie | ........................ | 345/173 |
| 2009/0228828 A1 * | 9/2009 | Beatty et al. | .................. | 715/786 |

FOREIGN PATENT DOCUMENTS

| | | |
|---|---|---|
| EP | 1577743 | 9/2005 |
| EP | 1837747 | 9/2007 |
| EP | 1953628 | 8/2008 |
| RU | 2280334 | 7/2003 |
| RU | 2253150 | 5/2005 |
| RU | 2266561 | 12/2005 |
| RU | 2340112 | 11/2008 |
| WO | 2006009516 | 1/2006 |
| WO | 2008/015504 | 2/2008 |

OTHER PUBLICATIONS

Georg Apitz et al., "CrossY: A Crossing-Based Drawing Application", vol. 6, Issue 2, Oct. 2004, XP-055022416.

* cited by examiner

*Primary Examiner* — Omar Abdul-Ali
*Assistant Examiner* — Phuong Nguyen
(74) *Attorney, Agent, or Firm* — Lee, Hong, Degerman, Kang & Waimey

(57) ABSTRACT

A mobile terminal includes a touchscreen configured to display a scroll region having a scroll bar at a portion of a displayed view and a controller configured to perform at least one function in response to a touch input received at the scroll region, the touch input including a first touch action in a first axial direction and a second touch action in a second axial direction, wherein a first function is performed in response to the first touch action, the first function being scrolling the displayed view and the first touch action being moving the scroll bar in the first axial direction along the scroll region and a second function is performed in response to the second touch action, the second function being a function that is different from the first function.

20 Claims, 27 Drawing Sheets

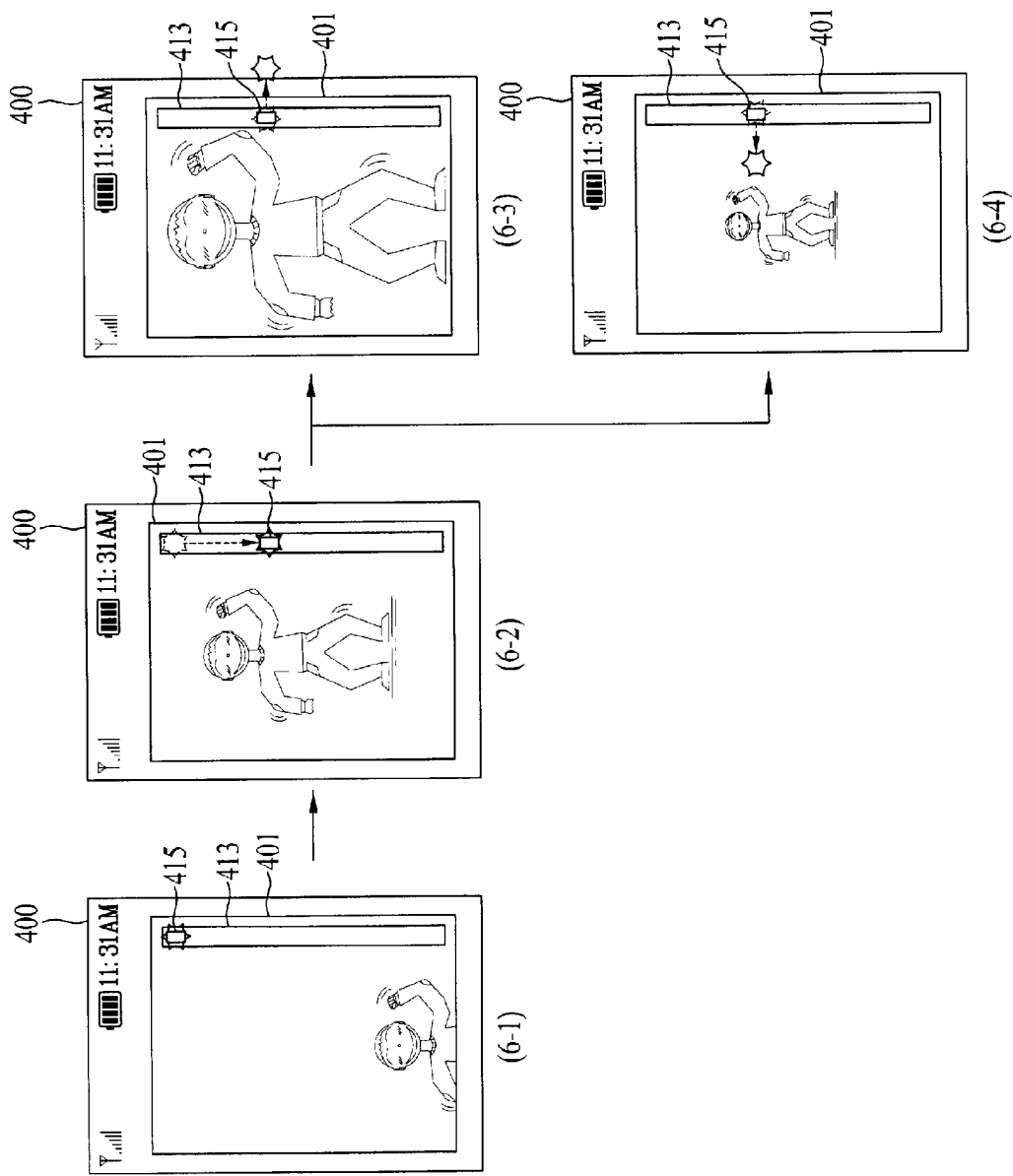

(7a-1) (7a-2)

(7b-1) (7b-2)

(12-1)    (12-2)

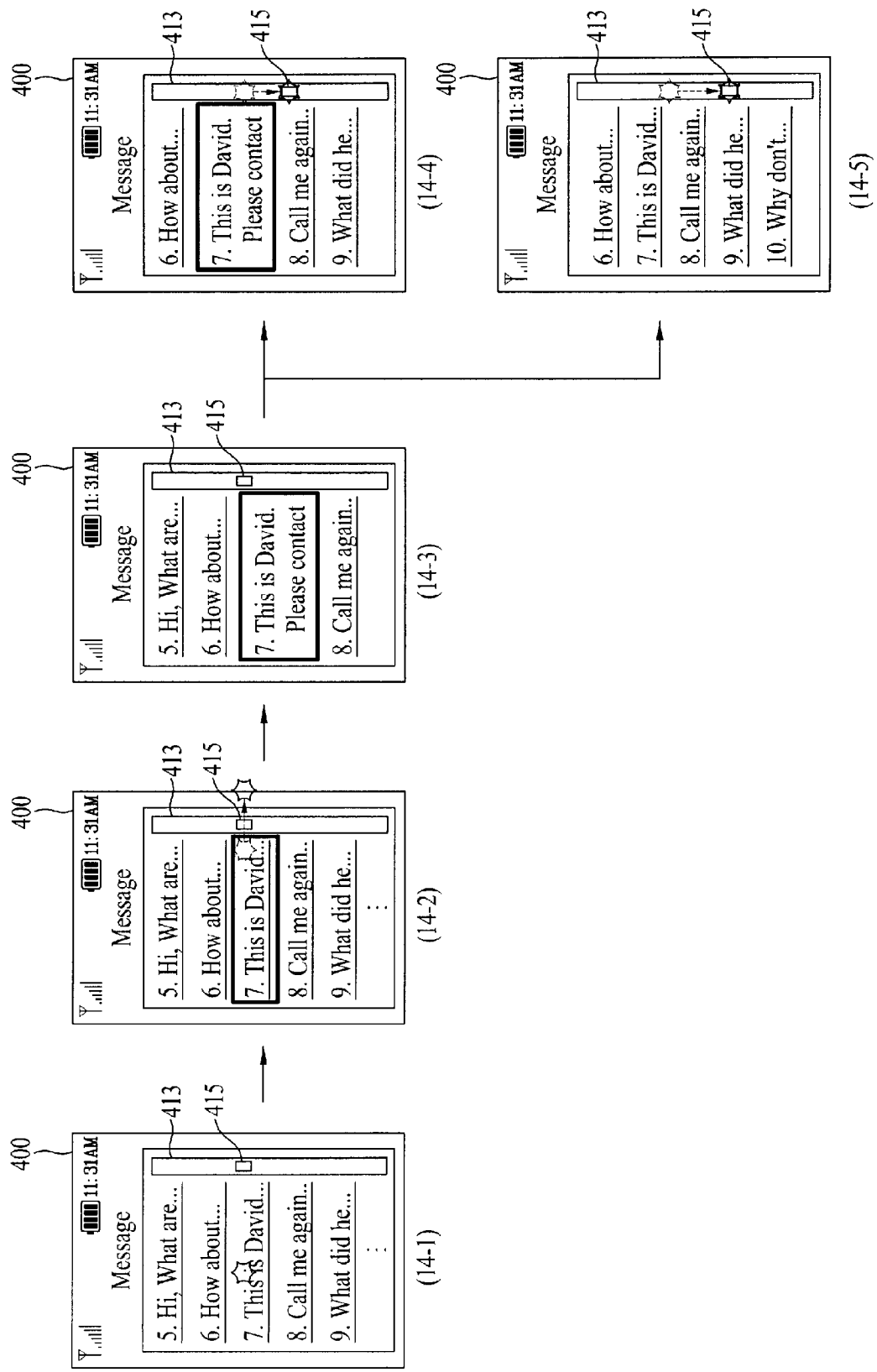

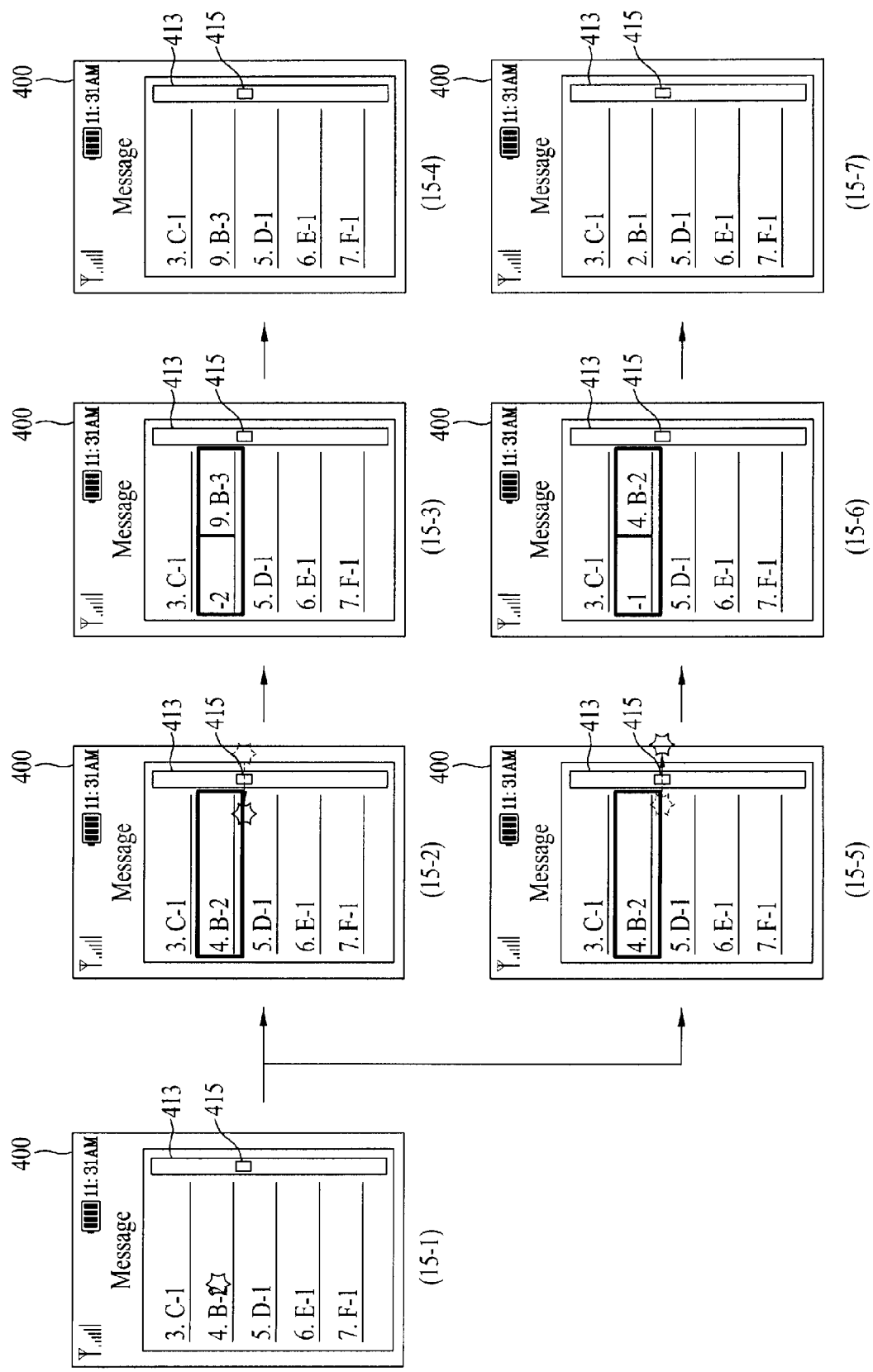

FIG. 21
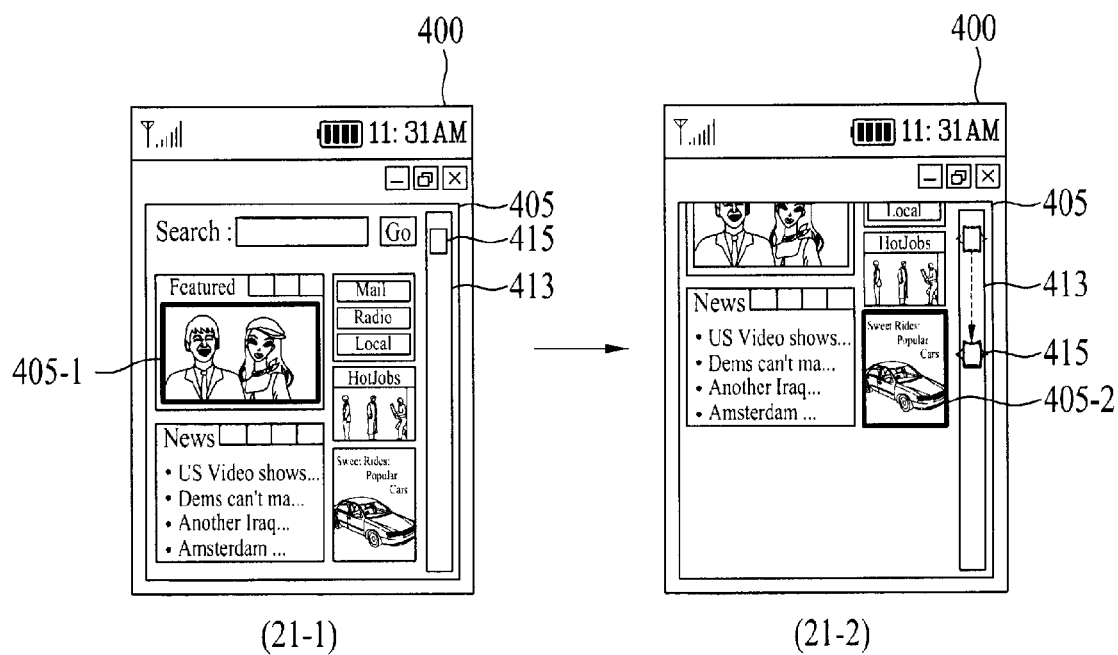
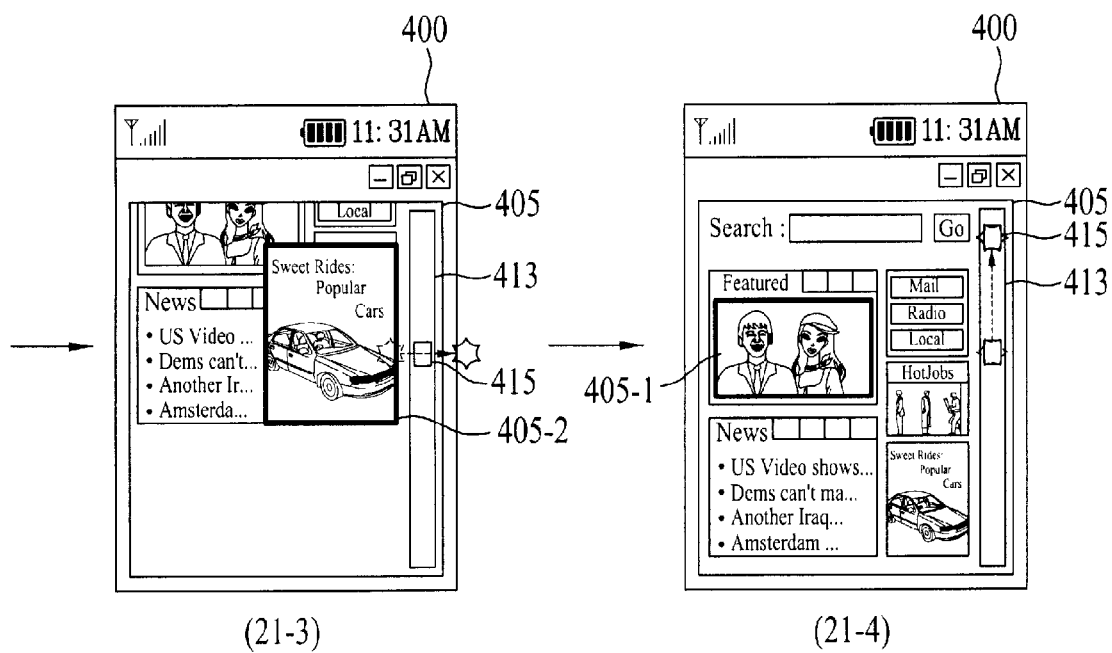

FIG. 25
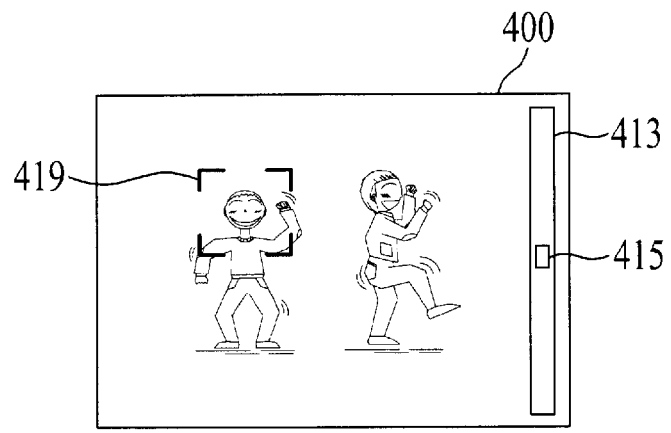
(25-1)
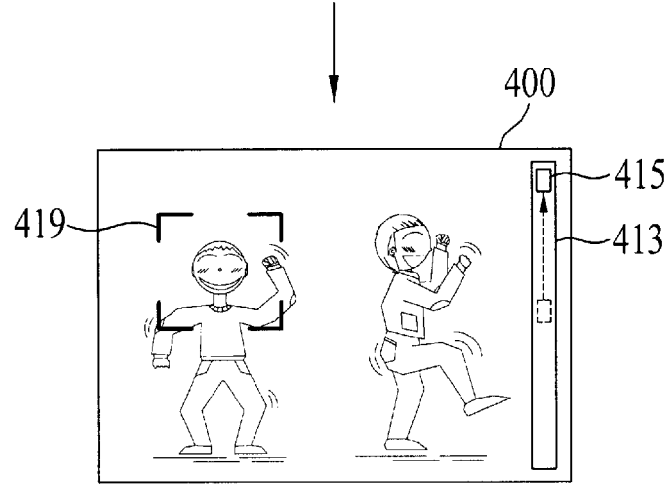
(25-2)
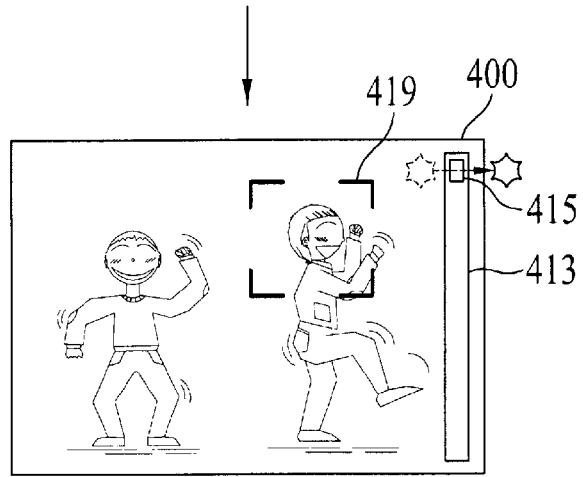
(25-3)

FIG. 26
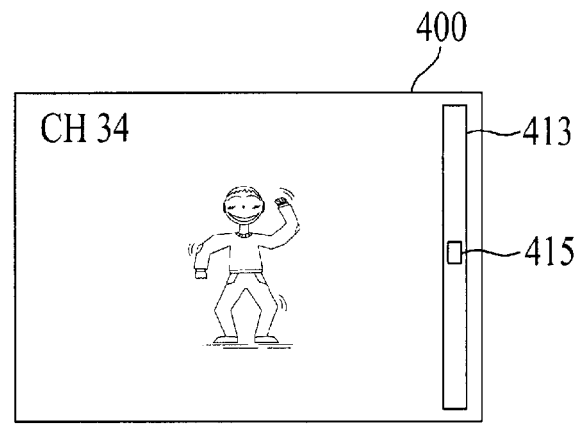
(26-1)
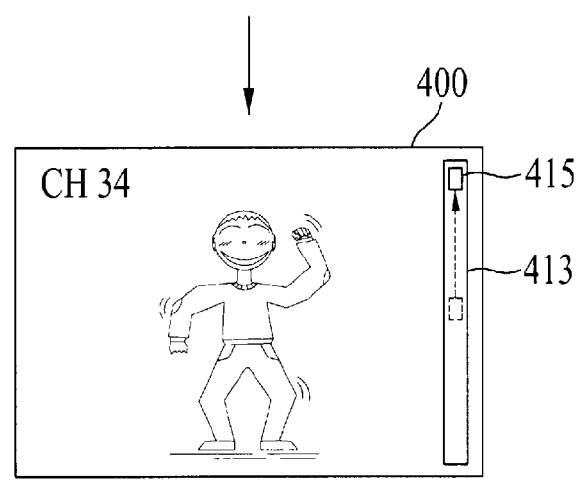
(26-2)
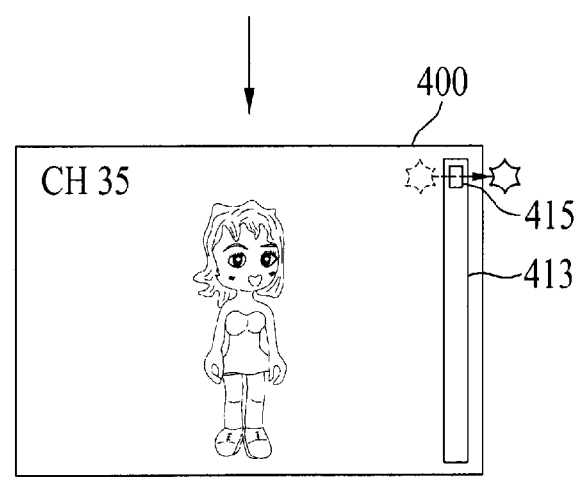
(26-3)

TERMINAL, CONTROLLING METHOD THEREOF AND RECORDABLE MEDIUM THEREOF

CROSS-REFERENCE TO RELATED APPLICATIONS

Pursuant to 35 U.S.C. §119(a), this application claims the benefit of earlier filing date and right of priority to Korean Application No. 10-2008-0086695, filed on Sep. 3, 2008, the contents of which are hereby incorporated by reference herein in their entirety.

FIELD OF THE INVENTION

The present invention relates to a terminal and controlling method thereof. While the present invention is suitable for a wide scope of applications, it is particularly suitable for facilitating a user to use the terminal.

DISCUSSION OF THE RELATED ART

A mobile terminal is a device which may be configured to perform various functions. Examples of such functions include data and voice communications, capturing images and video via a camera, recording audio, playing music files and outputting music via a speaker system, and displaying images and video on a display. Some terminals include additional functionality which supports game playing, while other terminals are also configured as multimedia players. More recently, mobile terminals have been configured to receive broadcast and multicast signals which permit viewing of contents, such as videos and television programs.

Generally, terminals can be classified into mobile terminals and stationary terminals according to their mobility. The mobile terminals can be further classified into handheld terminals and vehicle mounted terminals according to their mode of portability.

There are ongoing efforts to support and increase the functionality of mobile terminals. Such efforts include software and hardware improvements, as well as changes and improvements in the structural components which form the mobile terminal.

When the terminal operates as a multimedia device capable of performing the above-mentioned functions, menus in the terminal for controlling various functions may be complex. However, the menus for controlling the various functions may be confusing to a user manipulating the terminal. Therefore, efforts have been made to configure the various functions and menus to facilitate the user manipulating the terminal.

SUMMARY OF THE INVENTION

In accordance with an embodiment, a mobile terminal includes a touchscreen configured to display a scroll region having a scroll bar at a portion of a displayed view and a controller configured to perform at least one function in response to a touch input received at the scroll region, the touch input comprising a first touch action in a first axial direction and a second touch action in a second axial direction, wherein a first function is performed in response to the first touch action, the first function being scrolling the displayed view and the first touch action being moving the scroll bar in the first axial direction along the scroll region and a second function is performed in response to the second touch action, the second function differing from the first function.

In accordance with an embodiment, a method of controlling in a device comprising a touchscreen, wherein the touchscreen displays a scroll region with a scroll bar at a portion of a view displayed on the touchscreen, includes performing a first function in response to a first touch action, the first function being scrolling the displayed view and the first touch action being moving the scroll bar in a first axial direction within the scroll region and performing a second function in response to a second touch action, the second function differing from the first function, wherein at least one of the first function and second function is performed in response to a touch input received at the scroll region, the touch input comprising the first touch action in the first axial direction and the second touch action in a second axial direction.

In accordance with an embodiment, a method of controlling a mobile terminal includes displaying a scroll region extending in a first direction and a scroll bar provided within the scroll region on a touchscreen in a prescribed menu, scrolling an image displayed on the touchscreen when the scroll bar is touched and dragged in the first direction or a direction opposite to the first direction, and executing a function related to the prescribed menu when at least one of the scroll region and the scroll bar is touched and dragged in a second direction or a direction opposite to the second direction differing from the first direction and the direction opposite to the first direction.

These and other embodiments will also become readily apparent to those skilled in the art from the following detailed description of the embodiments having reference to the attached figures, the invention not being limited to any particular embodiment disclosed.

BRIEF DESCRIPTION OF THE DRAWINGS

The above and other aspects, features, and advantages of the present invention will become more apparent upon consideration of the following description of preferred embodiments, taken in conjunction with the accompanying drawings.

FIGS. 6 to 23 are diagrams of a display screen on which a method of controlling a mobile terminal according to various embodiments of the present invention is implemented.

FIG. 25 and FIG. 26 are diagrams of a display screen on which a method of controlling a mobile terminal according to another embodiment of the present invention is implemented.

DETAILED DESCRIPTION OF PREFERRED EMBODIMENTS

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

As used herein, the suffixes 'module', 'unit' and 'part' are used for elements in order to facilitate the disclosure only. Therefore, significant meanings or roles are not given to the suffixes themselves and it is understood that the 'module', 'unit' and 'part' can be used together or interchangeably.

The present invention can be applicable to a various types of terminals. Examples of such terminals include mobile terminals as well as stationary terminals, such as mobile phones, user equipment, smart phones, DTV, computers, digital broadcast terminals, personal digital assistants, portable multimedia players (PMP) and navigators. However, by way of non-limiting example only, further description will be with regard to a mobile terminal 100, and it should be noted that such teachings may apply equally to other types of terminals.

Figure 1:
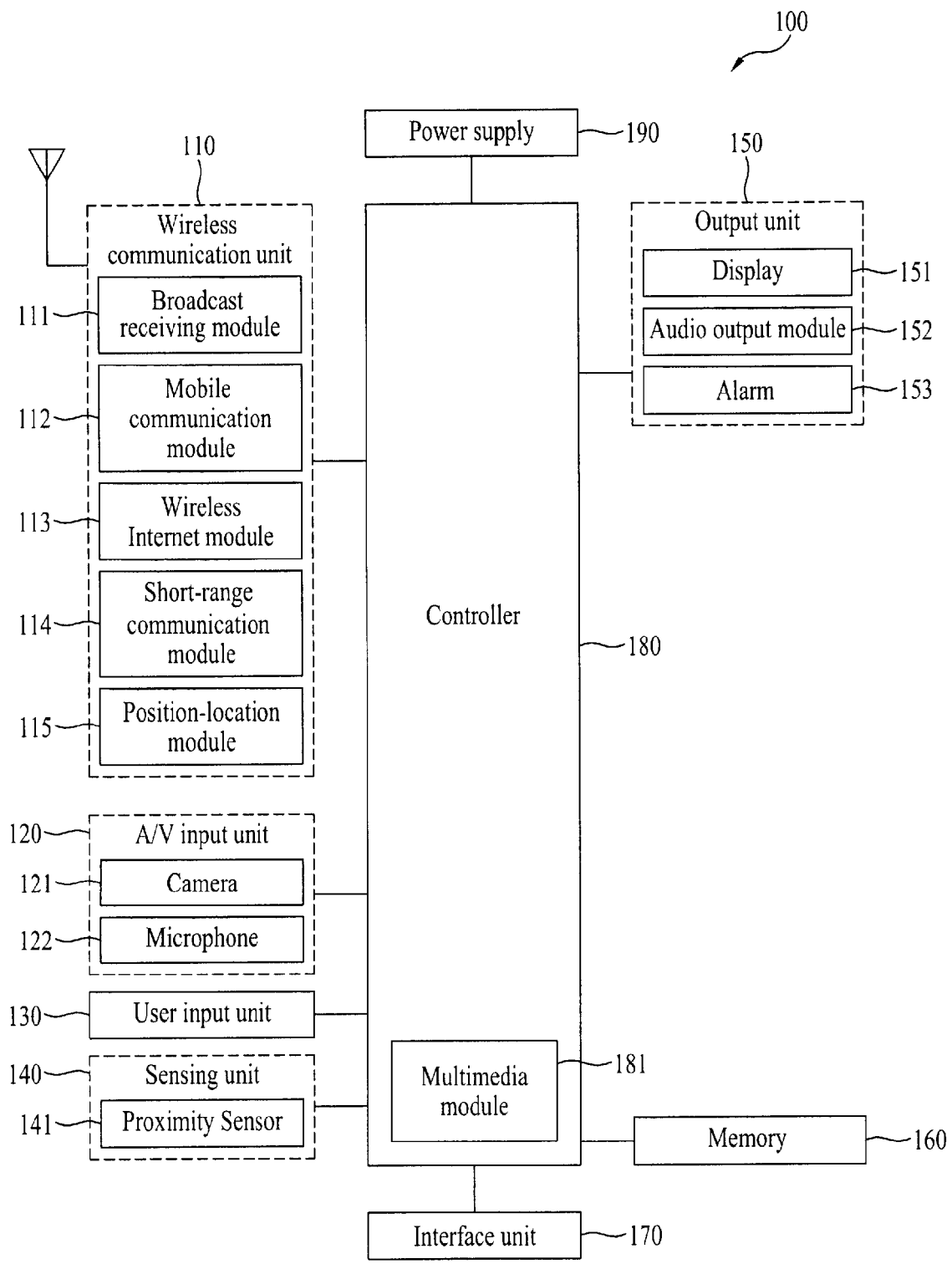
FIG. 1 is a block diagram of a mobile terminal in accordance with an embodiment of the present invention.

FIG. 1 is a block diagram of a mobile terminal 100 in accordance with an embodiment of the present invention. FIG. 1 shows the mobile terminal 100 having various components, but it is understood that implementing all of the illustrated components is not a requirement. Greater or fewer components may alternatively be implemented.

FIG. 1 shows a wireless communication unit 110 configured with several commonly implemented components. For example, the wireless communication unit 110 typically includes one or more components which permit wireless communication between the mobile terminal 100 and a wireless communication system or network within which the mobile terminal is located. In case of non-mobile terminals, the wireless communication unit 110 can be replaced with a wire communication unit. The wireless communication unit 110 and wire communication unit can be commonly referred to as a communication unit. A broadcast receiving module 111 receives a broadcast signal and/or broadcast associated information from an external broadcast managing entity via a broadcast channel. The broadcast channel may include a satellite channel and a terrestrial channel. The broadcast managing entity generally refers to a system which transmits a broadcast signal and/or broadcast associated information.

At least two broadcast receiving modules 111 can be provided to the mobile terminal 100 to pursue simultaneous reception of at least two broadcast channels or facilitation of broadcast channel switching. Examples of broadcast associated information include information associated with a broadcast channel, a broadcast program, a broadcast service provider, and the like. For example, the broadcast associated information may include an electronic program guide (EPG) of digital multimedia broadcasting (DMB) and electronic service guide (ESG) of digital video broadcast-handheld (DVB-H).

The broadcast signal may be implemented, for example, as a TV broadcast signal, a radio broadcast signal, and a data broadcast signal. If desired, the broadcast signal may further include a broadcast signal combined with a TV or radio broadcast signal.

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), the data broadcasting system known as media forward link only (MediaFLO®) and integrated services digital broadcast-terrestrial (ISDB-T). Receiving multicast signals is also possible. If desired, data received by the broadcast receiving module 111 may be stored in a suitable device, such as memory 160.

A mobile communication module 112 communicates wireless signals with one or more network entities such as a base station or Node-B. Such signals may represent, for example, audio, video, multimedia, control signaling, and data.

A wireless internet module 113 supports Internet access for the mobile terminal 100. This module may be internally or externally coupled to the mobile terminal 100. Suitable technologies for wireless internet may include, but are not limited to, WLAN (Wireless LAN)(Wi-Fi), Wibro (Wireless broadband), Wimax (World Interoperability for Microwave Access), and HSDPA (High Speed Downlink Packet Access). The wireless internet module can be replaced with a wire internet module in non-mobile terminals. The wireless internet module 113 and wire internet module may be commonly referred to as an internet module.

A short-range communication module 114 facilitates relatively short-range communications. Suitable technologies for short-range communication may include, but are not limited to, radio frequency identification (RFID), infrared data association (IrDA), ultra-wideband (UWB), as well as the networking technologies commonly referred to as Bluetooth and ZigBee.

A position-location module 115 identifies or otherwise obtains the location of the mobile terminal 100. This module may be implemented using, for example, global positioning system (GPS) components which cooperate with associated satellites, network components, and combinations thereof.

According to the current technology, the position-location module 115 is able to precisely calculate current 3-dimensional position information based on longitude, latitude and altitude by calculating distance information and precise time information from at least three satellites and then applying triangulation to the calculated information. Currently, location and time information are calculated using three satellites, and errors of the calculated location position and time information are then amended using another satellite. Besides, the position-location module 115 is able to calculate speed information by continuously calculating a real-time current location.

An audio/video (A/V) input unit 120 is configured to provide audio or video signal input to the mobile terminal 100. As shown, the A/V input unit 120 includes a camera 121 and a microphone 122. The camera 121 receives and processes image frames of still pictures or video.

A microphone 122 receives an external audio signal while the portable device is in a particular mode, such as phone call mode, recording mode or voice recognition mode. This audio signal is processed and converted into digital data.

The portable device, and specifically the A/V input unit 120, typically includes assorted noise removing algorithms to remove noise generated in the course of receiving the external audio signal. Data generated by the A/V input unit 120 may be stored in the memory 160, utilized by the output unit 150, or transmitted via one or more modules of communication unit 110. If desired, two or more microphones and/or cameras may be used.

A user input unit 130 generates input data responsive to user manipulation of an associated input device or devices. Examples of such devices include a keypad, a dome switch, a touchpad such as static pressure/capacitance, a jog wheel and a jog switch. A specific example is one in which the user input unit 130 is configured as a touchpad in cooperation with a display, which will be described in more detail below.

A sensing unit 140 provides status measurements of various aspects of the mobile terminal 100. For example, the sensing unit may detect an open/close status of the mobile terminal 100, relative positioning of components such as a display and keypad of the mobile terminal, a change of position of the mobile terminal or a component of the mobile terminal, a presence or absence of user contact with the mobile terminal, orientation or acceleration/deceleration of the mobile terminal.

If the mobile terminal 100 is configured as a slide-type mobile terminal, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device.

An interface unit 170 is often implemented to couple the mobile terminal with external devices. Typical external devices include wired/wireless headphones, external chargers, power supplies, storage devices configured to store data such as audio, video, and pictures, as well as earphones and microphones. The interface unit 170 may be configured using a wired/wireless data port, audio input/output ports, video input/output port, a card socket for coupling to a memory card, a subscriber identity module (SIM) card, a user identity module (UIM) card, or removable user identity module (RUIM) card.

When the mobile terminal 110 is connected to an external cradle, the interface unit 170 becomes a passage for supplying the mobile terminal 100 with a power from the cradle or a passage for delivering various command signals input from the cradle by a user to the mobile terminal 100. Each of the various command signals input from the cradle or the power can operate as a signal enabling the mobile terminal 100 to recognize that it is correctly loaded in the cradle.

An output unit 150 generally includes various components that support the output requirements of the mobile terminal 100. A display 151 is typically implemented to visually display information associated with the mobile terminal 100. For example, if the mobile terminal 100 is operating in a phone call mode, the display will generally provide a user interface or graphical user interface that includes information associated with placing, conducting, and terminating a phone call. As another example, if the mobile terminal 100 is in a video call mode or a photographing mode, the display 151 may additionally or alternatively display images associated with these modes.

One particular implementation includes the display 151 configured as a touchscreen working in cooperation with an input device, such as a touchpad. This configuration permits the display 151 to function both as an output device and an input device in association with the sensing unit 140.

The display 151 may be implemented using known display technologies including a liquid crystal display (LCD), a thin film transistor-liquid crystal display (TFT-LCD), an organic light-emitting diode display (OLED), a flexible display and a three-dimensional display. Some of the displays may be configured transparent to see an external environment. They can be named transparent displays. And, a transparent LCD display is a representative example for the transparent displays.

The mobile terminal 100 may include one or more of displays 151. An example of a two-display embodiment is one in which one display 151 is configured as an internal display viewable when the mobile terminal 100 is in an opened position and a second display 151 configured as an external display viewable in both the opened and closed positions.

The touchscreen can be configured to detect a touch input pressure as well as a touch input position and size in association with the sensing unit 140. Further, a proximity sensor 141 can be provided within or around the touchscreen. The proximity sensor 141 detects an object approaching a prescribed detecting surface or a presence or absence of an object existing around itself using an electromagnetic power or infrared rays without mechanical contact. Hence, the proximity sensor 141 is superior to a contact sensor in lifespan and utilization.

Example for an operational principle of the proximity sensor 141 is explained as follows. First of all, if an object approaches a sensor detecting surface while an oscillation circuit oscillates a sine radio frequency, an oscillation amplitude of the oscillation circuit attenuates or stops. This change is converted to an electric signal to detect a presence or absence of the object. Thus, even if any material except a metallic comes between the RF oscillation proximity sensor and the object, a proximity switch is able to detect the object without interference with the material.

In spite of not providing the proximity sensor 141, if the touchscreen is electrostatic, it can be configured to detect the proximity of a pointer through an electric field change attributed to the proximity of the pointer. Thus, if the pointer is placed in the vicinity of the touchscreen without being actually contacted with the touchscreen, it is able to detect a position of the pointer and a distance between the pointer and the touchscreen. For clarity and convenience of explanation, an action for enabling the pointer approaching the touchscreen to be recognized as placed on the touchscreen is named 'proximity touch' and an action of enabling the pointer to actually come into contact with the touchscreen is named 'contact touch'. And, a position, at which the proximity touch is made to the touchscreen using the pointer, means a position of the pointer vertically corresponding to the touchscreen when the pointer makes the proximity touch.

If the proximity sensor 141 is used, it is able to sense a proximity touch and its pattern, for example, proximity touch distance, proximity touch direction, proximity touch speed, proximity touch position, proximity touch moving state, and the like. And, it is also able to output information corresponding to the sensed proximity touch action and the proximity touch pattern to the touchscreen.

FIG. 1 further shows the output unit 150 having an audio output module 152 which supports the audio output requirements of the mobile terminal 100. The audio output module 152 is often implemented using one or more speakers, buzzers, other audio producing devices, and combinations thereof.

The audio output module 152 functions in various modes such as call-receiving mode, call-placing mode, recording mode, voice recognition mode and broadcast reception mode. During operation, the audio output module 152 outputs audio relating to a particular function or status, such as call received, message received, or errors.

The output unit 150 is further shown having an alarm 153, which is commonly used to signal or otherwise identify the occurrence of a particular event associated with the mobile terminal 100. Typical events include call received, message received and user input received.

An example of a signal provided by the output unit 150 is tactile sensations. For example, the alarm 153 may be configured to vibrate responsive to the mobile terminal 100 receiving a call or message. As another example, vibration is provided by the alarm 153 responsive to receiving user input at the mobile terminal 100, thereby providing a tactile feedback mechanism. It is understood that the various signals provided by the components of output unit 150 may be separately performed or performed using any combination of such components.

The memory 160 is generally used to store various types of data to support the processing, control, and storage requirements of the mobile terminal 100. Examples of such data include program instructions for applications operating on the mobile terminal 100, contact data, phonebook data, messages, pictures, and video.

In the memory 160, use frequency data, such as a use frequency for each phone number, each message, each multimedia, may be stored together. Moreover, data for various patterns of vibration and/or sound output in case of a touch input to the touchscreen can be stored in the memory 160.

As map information can be stored in the memory 160, user's convenience can be further provided in a manner of providing the map information to a user if necessary. Moreover, a recent use history or a cumulative use frequency of each menu in the mobile terminal 100 can be stored in the memory 160.

The memory 160 shown in FIG. 1 may be implemented using any type or combination of suitable volatile and non-volatile memory or storage devices including random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, card-type memory, or other similar memory or data storage device.

A controller 180 typically controls the overall operations of the mobile terminal 100. For example, the controller 180 performs the control and processing associated with voice calls, data communications, instant message communication, video calls, camera operations and recording operations.

The controller 180 may include a multimedia module 181 that provides multimedia playback. The multimedia module 181 may be configured as part of the controller 180, or implemented as a separate component. Moreover, the controller 180 is able to perform a pattern recognizing process for recognizing a writing input and a picture drawing input carried out on the touchscreen as characters or images, respectively.

A power supply 190 provides power required by the various components for the mobile terminal 100. The power may be internal power, external power, or combinations thereof.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. In some cases, such embodiments may also be implemented by controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

The mobile terminal 100 may be implemented in a variety of different configurations. Examples of such configurations include folder-type, slide-type, bar-type, rotational-type, swing-type and combinations thereof. For clarity, further disclosure will primarily relate to a slide-type mobile terminal 100. However, such teachings apply equally to other types of mobile terminals.

Figure 2:
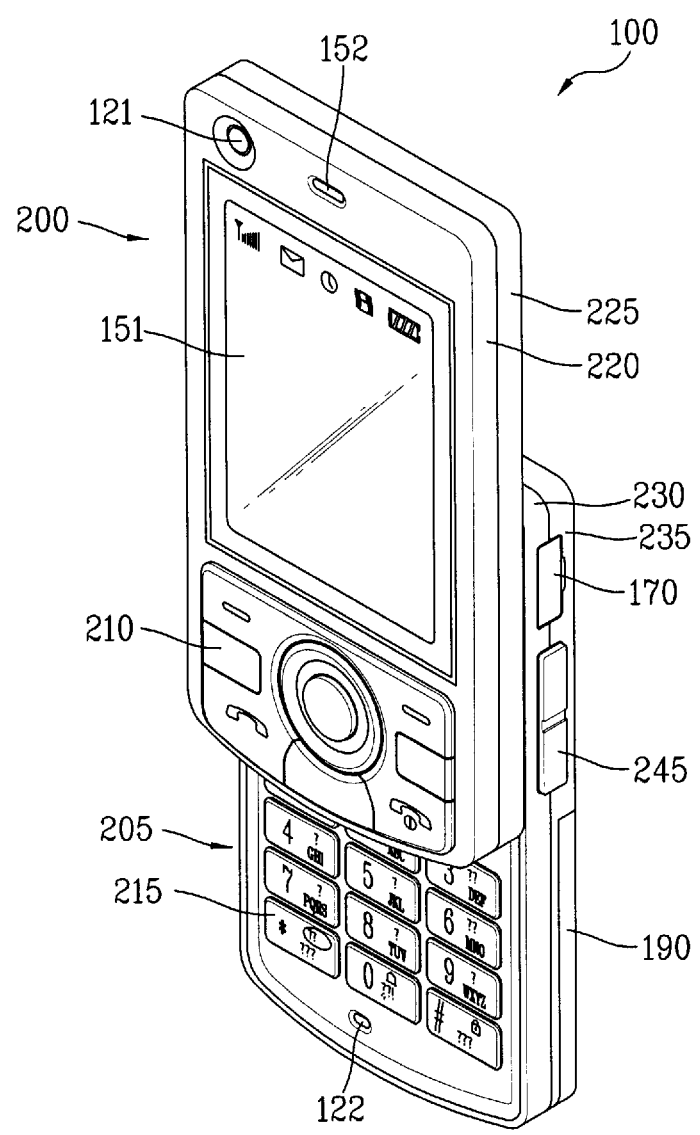
FIG. 2 is a perspective diagram of a front side of a mobile terminal according to an embodiment of the present invention.

FIG. 2 is a perspective view of a front side of a mobile terminal 100 according to an embodiment of the present invention. In FIG. 2, the mobile terminal 100 is shown having a first body 200 configured to slidably cooperate with a second body 205.

The user input unit 130 described in FIG. 1 may include a first input unit such as function keys and four directional keys 210, a second input unit such as keypad 215 and a third input unit such as side keys 245. The function keys 210 are associated with the first body 200, and the keypad 215 is associated with the second body 205. The keypad 215 includes various keys such as numbers, characters, and symbols to enable a user to place a call, prepare a text or multimedia message, and otherwise operate the mobile terminal 100.

The first body 200 slides relative to the second body 205 between open and closed positions. Although not shown in drawings, in case of a folder-type mobile terminal, a first body thereof folds and unfolds relative to a second body thereof between open and closed positions. In addition, in case of a swing-type mobile terminal, a first body thereof swings relative to a second body thereof between open and closed positions.

In a closed position, the first body 200 is positioned over the second body 205 in such a manner that the keypad 215 is substantially or completely obscured by the first body 200. In the open position, user access to the keypad 215 is possible. The function keys 210 are conveniently configured for a user to enter commands such as start, stop and scroll.

The mobile terminal 100 is operable in either a standby mode, in which it is able to receive a call or message and to receive and respond to network control signaling or an active call mode. Typically, the mobile terminal 100 functions in the standby mode in the closed position and in an active mode in the open position. This mode configuration may be changed as required or desired.

The first body 200 is shown formed from a first case 220 and a second case 225. The second body 205 is shown formed from a first case 230 and a second case 235. The first case 230 and second case 235 are usually formed from a suitably rigid material, such as injection molded plastic, or formed using metallic material, such as stainless steel (STS) and titanium (Ti).

One or more intermediate cases may be provided between the first case 230 and second case 235 of one or both of the first body 200 and second body 205. The first body 200 and second body 205 are typically sized to receive electronic components necessary to support operation of the mobile terminal 100.

The first body 200 has a camera 121 and audio output unit 152, which is configured as a speaker, positioned relative to the display 151. The camera 121 may be constructed such that it can be selectively positioned relative to first body 200 such as by rotation or swiveling.

The function keys 210 are positioned adjacent to a lower side of the display 151, which is shown implemented as an LCD or OLED. The display 151 may also be configured as a touchscreen having an underlying touchpad which generates signals responsive to user contact with the touchscreen, such as with a finger or stylus.

The second body 205 has a microphone 122 positioned adjacent to the keypad 215 and having side keys 245, which are one type of a user input unit as mentioned above, positioned along the side of second body 205. Preferably, the side keys 245 are configured as hot keys, such that the side keys are associated with a particular function of the mobile terminal 100. An interface unit 170 is shown positioned adjacent to the side keys 245, and a power supply 190 in a form of a battery is shown located on a lower portion of the second body 205.

Figure 3:
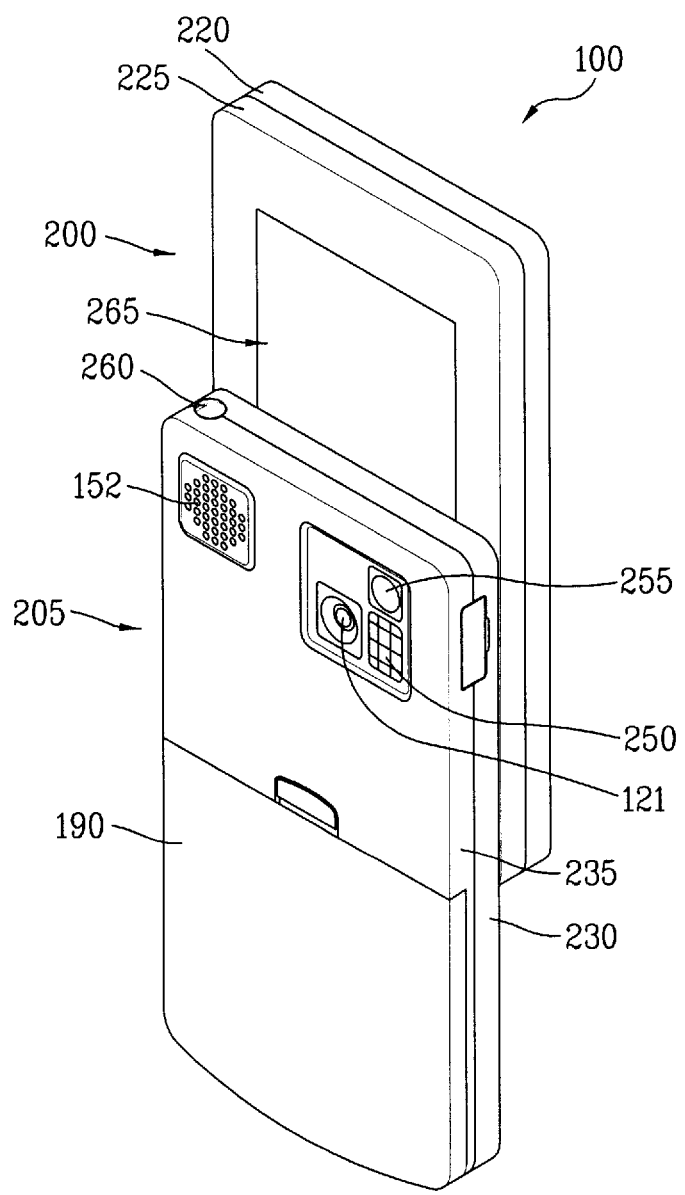
FIG. 3 is a perspective diagram of a backside of the mobile terminal shown in FIG. 2.

FIG. 3 is a rear view of the mobile terminal 100 shown in FIG. 2. FIG. 3 shows the second body 205 having a camera 121 with an associated flash 250 and mirror 255. The flash 250 operates in conjunction with the camera 121. The mirror 255 is useful for assisting a user to position the camera 121 in a self-portrait mode.

The camera 121 of the second body 205 faces a direction which is opposite to a direction faced by the camera 121 of the first body 200 (FIG. 2). Each of the cameras 121 of the first body 200 and second body 205 may have the same or different capabilities.

In an embodiment, the camera 121 of the first body 200 operates with a relatively lower resolution than the camera 121 of the second body 205. Such an arrangement works well during a video conference, for example, in which reverse link bandwidth capabilities may be limited. The relatively higher resolution of the camera 121 of the second body 205 shown in FIG. 3 is useful for obtaining higher quality pictures for later use or for communicating with other parties.

The second body 205 also includes an audio output module 152 located on an upper side of the second body and configured as a speaker. The audio output modules 152 of the first body 200 and second body 205 may cooperate to provide stereo output. Moreover, either or both of these audio output modules 152 may be configured to operate as a speakerphone.

A broadcast signal receiving antenna 260 is shown located at an upper end of the second body 205. The antenna 260 functions in cooperation with the broadcast receiving module 111. The antenna 260 may be fixed or configured to retract into the second body 205. The rear side of the first body 200 includes a slide module 265, which slidably couples with a corresponding slide module located on the front side of the second body 205.

It is understood that the illustrated arrangement of the various components of the first body 200 and second body 205 may be modified as required or desired. In general, some or all of the components of one body may alternatively be implemented on the other body. In addition, the location and relative positioning of such components are not critical to many embodiments, and therefore, the components may be positioned at locations which differ from those shown by the representative figures.

The mobile terminal 100 of FIGS. 1-3 may be configured to operate within a communication system which transmits data via frames or packets, including both wireless and wired communication systems, and satellite-based communication systems. Such communication systems utilize different air interfaces and/or physical layers.

Examples of air interfaces utilized by the communication systems include example, frequency division multiple access (FDMA), time division multiple access (TDMA), code division multiple access (CDMA), the universal mobile telecommunications system (UMTS), the long term evolution (LTE) of the UMTS, and the global system for mobile communications (GSM). By way of non-limiting example only, further description will relate to a CDMA communication system, but such teachings apply equally to other system types.

Figure 4:
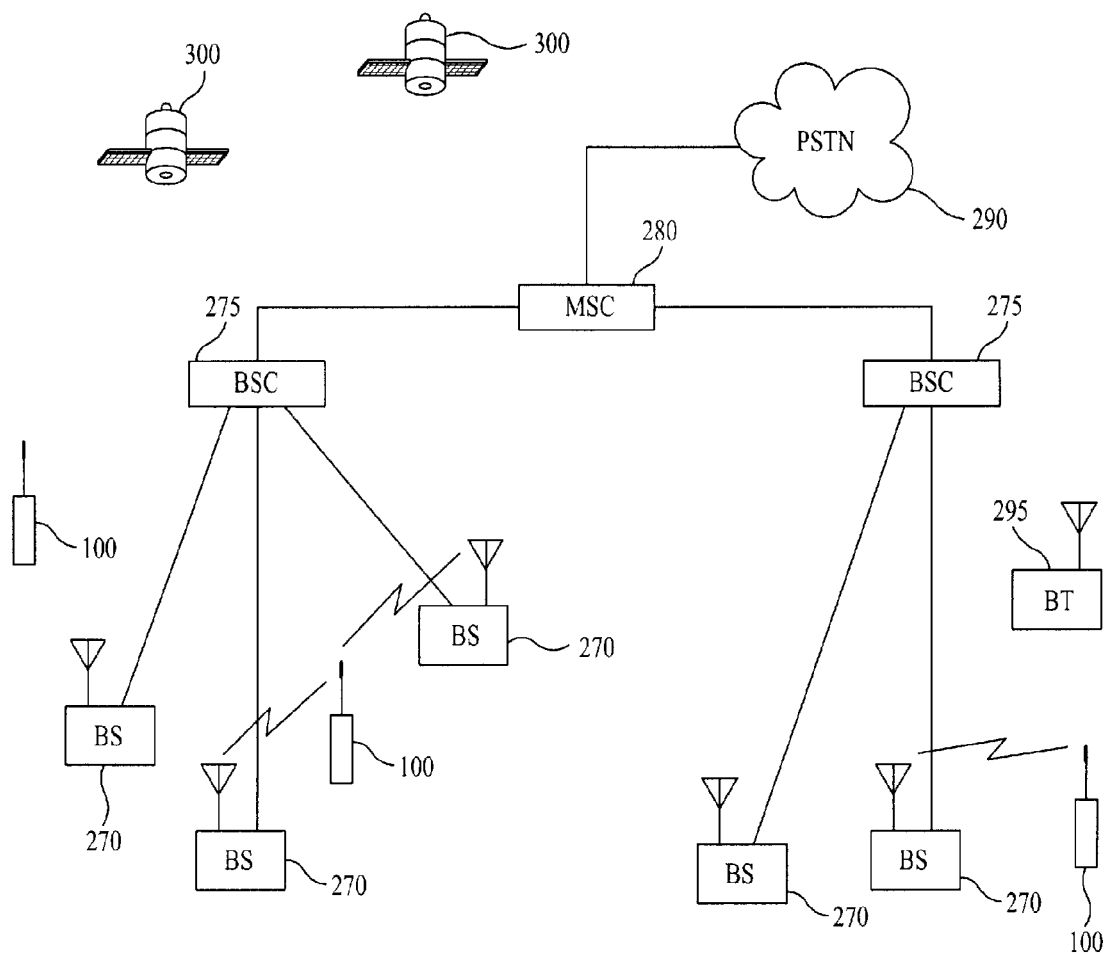
FIG. 4 is a block diagram of a wireless communication system in which a mobile terminal according to the present invention is operable.

Referring to FIG. 4, a CDMA wireless communication system is shown having a plurality of mobile terminals 100, a plurality of base stations 270, a plurality of base station controllers (BSCs) 275, and a mobile switching center (MSC) 280.

The MSC 280 is configured to interface with a conventional public switch telephone network (PSTN) 290. The MSC 280 is also configured to interface with the BSCs 275.

The BSCs 275 are coupled to the base stations 270 via backhaul lines. The backhaul lines may be configured in accordance with any of several known interfaces including, for example, E1/T1, ATM, IP, PPP, Frame Relay, HDSL, ADSL, or xDSL. It is to be understood that the system may include more than two BSCs 275.

Each base station 270 may include one or more sectors, each sector having an omnidirectional antenna or an antenna pointed in a particular direction radially away from the base station 270. Alternatively, each sector may include two antennas for diversity reception. Each base station 270 may be configured to support a plurality of frequency assignments, with each frequency assignment having a particular spectrum, such as 1.25 MHz or 5 MHz.

The intersection of a sector and frequency assignment may be referred to as a CDMA channel. The base stations 270 may also be referred to as base station transceiver subsystems (BTSs). In some cases, the term "base station" may be used to refer collectively to a BSC 275, and one or more base stations 270. The base stations 270 may also be denoted as "cell sites." Alternatively, individual sectors of a given base station 270 may be referred to as cell sites.

A terrestrial digital multimedia broadcasting (DMB) transmitter 295 is shown broadcasting to mobile terminals 100 operating within the system. The broadcast receiving module 111 of the mobile terminal 100 is typically configured to receive broadcast signals transmitted by the DMB transmitter 295. Similar arrangements may be implemented for other types of broadcast and multicast signaling as discussed above. FIG. 4 further depicts several global positioning system (GPS) satellites 300. Such satellites facilitate locating the position of some or all of the mobile terminals 100. Two satellites are depicted, but it is understood that useful positioning information may be obtained with greater or fewer satellites.

The position-location module 115 of the mobile terminal 100 is typically configured to cooperate with the satellites 300 to obtain desired position information. It is to be appreciated that other types of position detection technology, such as location technology that may be used in addition to or instead of GPS location technology, may alternatively be implemented. Some or all of the GPS satellites 300 may alternatively or additionally be configured to provide satellite DMB transmissions.

During typical operation of the wireless communication system, the base stations 270 receive sets of reverse-link signals from various mobile terminals 100. The mobile terminals 100 engage in calls, messaging, and other communications.

Each reverse-link signal received by a given base station 270 is processed within that base station 270. The resulting data is forwarded to an associated BSC 275.

The BSC 275 provides call resource allocation and mobility management functionality including soft handoffs between the base stations 270. The BSCs 275 also route the received data to the MSC 280, which provides additional routing services for interfacing with the PSTN 290.

Similarly, the PSTN interfaces with the MSC 280, and the MSC 280 interfaces with the BSCs 275. The BSCs 275 control the base stations 270 to transmit sets of forward-link signals to the mobile terminals 100.

In the following description, a control method applicable to the above-configured mobile terminal 100 is explained with respect to various embodiments. It is understood that the following embodiments can be implemented independently or through combinations thereof.

The following embodiments can be implemented more easily when the display 151 includes a touchscreen. In the following description, a display screen 400 of the touchscreen 151 shall be indicated by a reference number 400.

Figure 5:
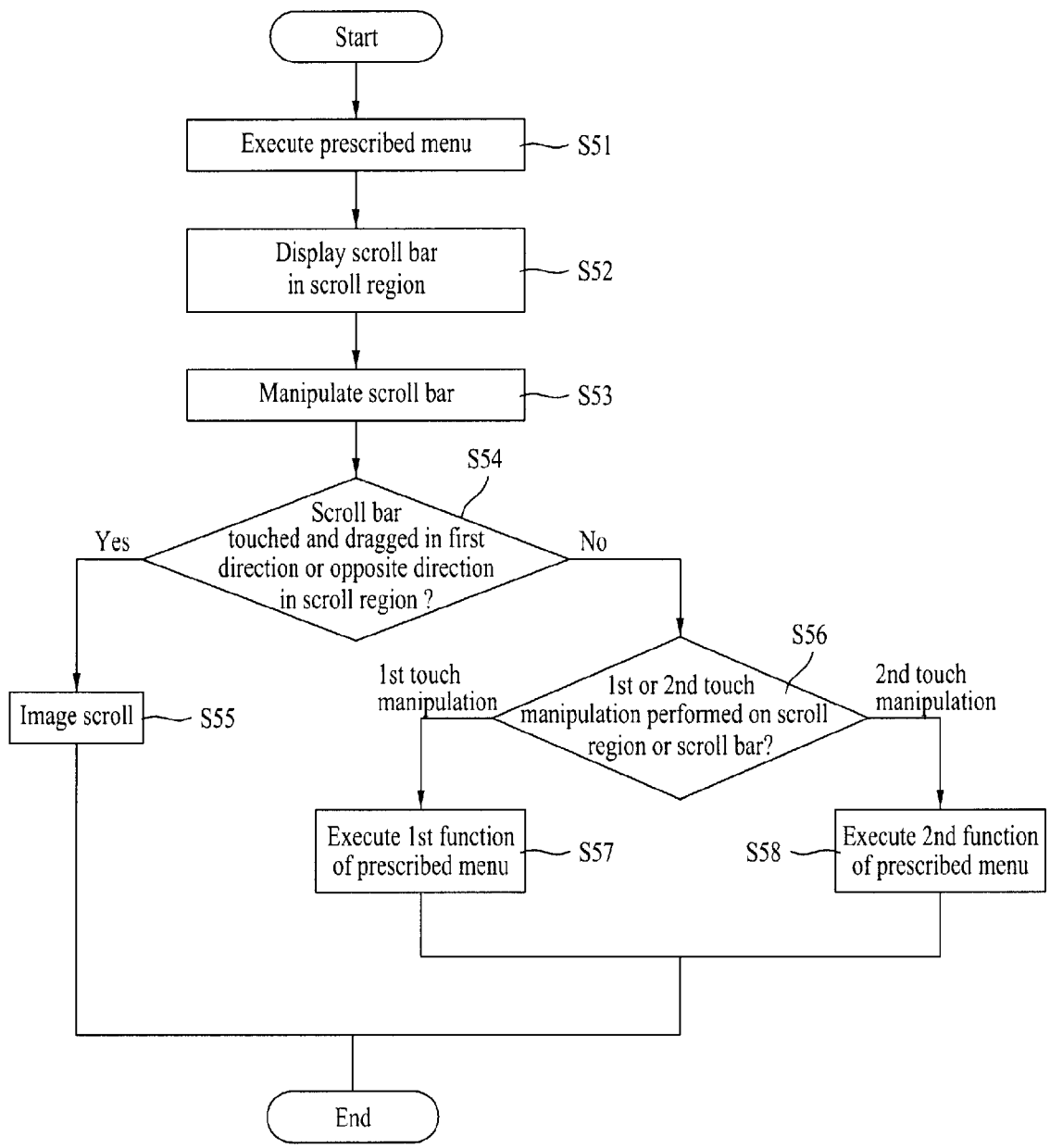
FIG. 5 is a flowchart illustrating controlling a mobile terminal according to an embodiment of the present invention.

FIG. 5 is illustrates controlling a mobile terminal 100 according to an embodiment of the present invention. When a prescribed menu is executed by the mobile terminal 100 (S51), the display 151 displays a scroll bar in a scroll region displayed for the prescribed menu (S52). Once the scroll bar is manipulated (S53), and the scroll bar is touched and dragged in a first direction or in an opposite direction of the first direction in the scroll region (S54), an image displayed on the display 151 is scrolled.

Alternatively, when the scroll bar is manipulated (S53), if the scroll bar is not touches and dragged in the first direction or in the opposite direction in the scroll region (S54), the mobile terminal 100 determines whether a first or second touch manipulation is performed on the scroll region or scroll bar (S56). When the first touch manipulation is performed, a first function of the prescribed menu is executed (S57) and when a second touch manipulation is performed, a second function of the prescribed menu is executed (S58).

FIGS. 6 to 23 are diagrams of a display screen on which a method of controlling the mobile terminal 100 according to various embodiments of the present invention are implemented. Referring to (6-1) of FIG. 6, as an example, an image viewer function is being executed in the mobile terminal 100. An image viewer 401 for viewing an image is displayed on the touchscreen 400. Within the image viewer 401, a scroll region 413 extending in a vertical direction and a scroll bar 415 movable within the scroll region 413 are displayed. If the scroll bar 415 is touched and dragged by a pointer, such as finger or stylus pen, in the vertical direction, the image displayed within the image viewer 401 is scrolled responsive to the dragging.

Alternatively or in addition to the above described scroll region 413 and scroll bar 415, a different type of scroll region and scroll bar may be displayed in the image viewer 401 to scroll an image in a horizontal direction. In the present disclosure, the scroll region 413 and scroll bar 415 for scrolling in the vertical direction will be used in the following description as an example. The scroll bar 415 is touched, for example, by contact touch or proximity touch, and dragged by the pointer in a top-to-bottom direction.

Referring to (6-2) of FIG. 6, the image is scrolled bottom to top or moves upward when the scroll bar is dragged in the top-to-bottom or downward direction. If the scroll bar 415 is touched and dragged again in bottom-to-top direction, the image can be scrolled top to bottom or moves downward.

Referring to (6-3) of FIG. 6, when the scroll bar 415 is touched and flicked or dragged in one direction, for example, to the right, perpendicular to the vertical direction, the image size is enlarged. In contrast, referring to (6-4) of FIG. 6, if the scroll bar 415 is touched and flicked or dragged in the other direction, for example, to the left, perpendicular to the vertical direction, the image size is reduced.

Alternatively to enlarging or reducing the image by touching and flicking in one direction perpendicular to the vertical direction, as described above, the mobile terminal 100 may be configured to enlarge the image size without dragging the scroll bar 415, by touching the scroll bar 415 for a period of time. Further, the mobile terminal 100 may be configured to reduce the image size by tapping the scroll bar 415.

Touch and drag can be performed on the scroll bar 415 in the vertical direction, from the top to the bottom or from the bottom to the top. Further, two kinds of touch manipulations can be performed on the scroll bar 415 as well. For example, the two kinds of manipulations may include touch and drag of the scroll bar 415 in the left direction, and touch and drag of the scroll bar in the right direction. Alternatively, the two kinds of touch manipulations may include long-touch of the scroll bar 415 at least for a period of time and tapping of the scroll bar.

The two kinds of manipulations can be used to perform a function related to the image viewer function. In the following description, one of the two kinds of manipulations is called a first touch manipulation and the other is called a second touch manipulation.

Figure 7A:
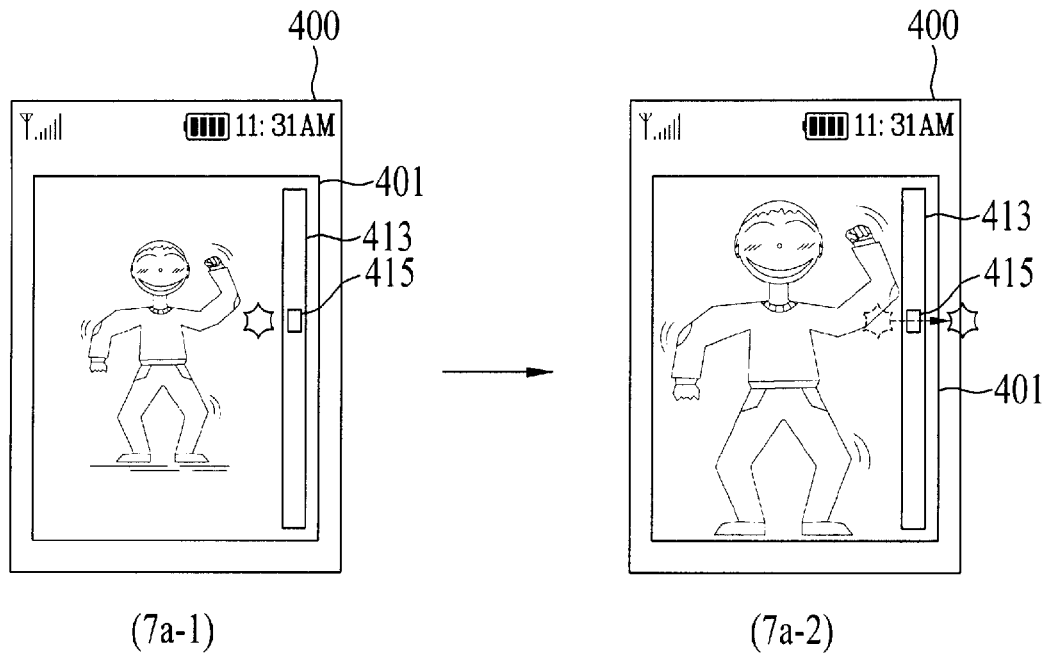

In the first or second touch manipulation using flicking, it is not necessary for the scroll bar 415 to be touched and then flicked in the right or left direction. Referring to FIG. 7A, when the pointer touches and then flicks the touchscreen to the right or left, it can be configured such that the first or second touch manipulation is recognized when the pointer passes through the scroll bar 415 only.

Figure 7B:
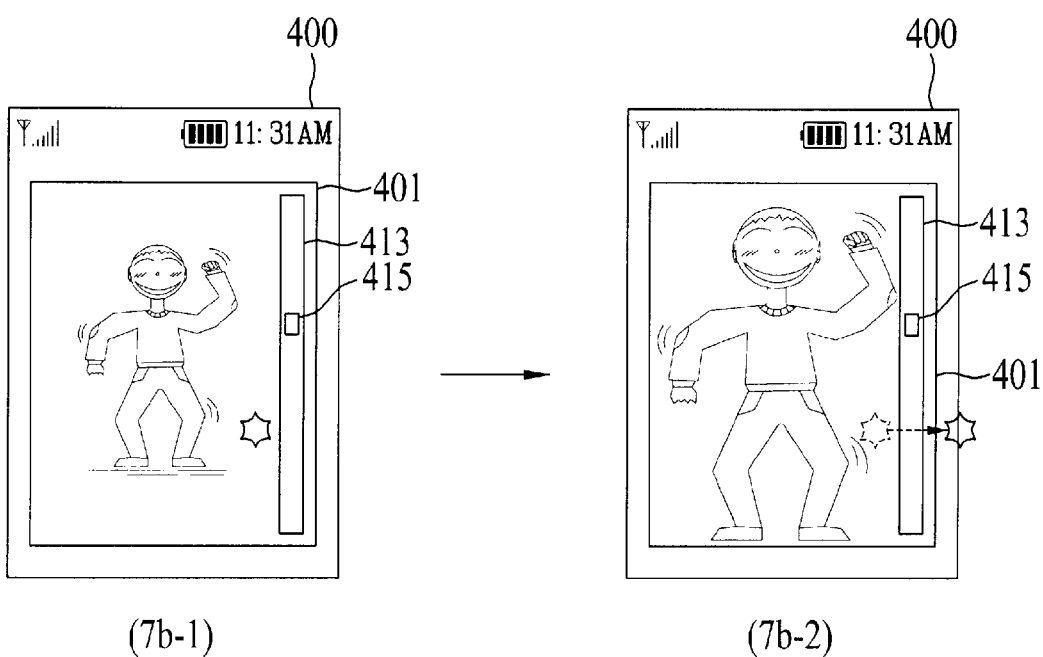
Figure 8:
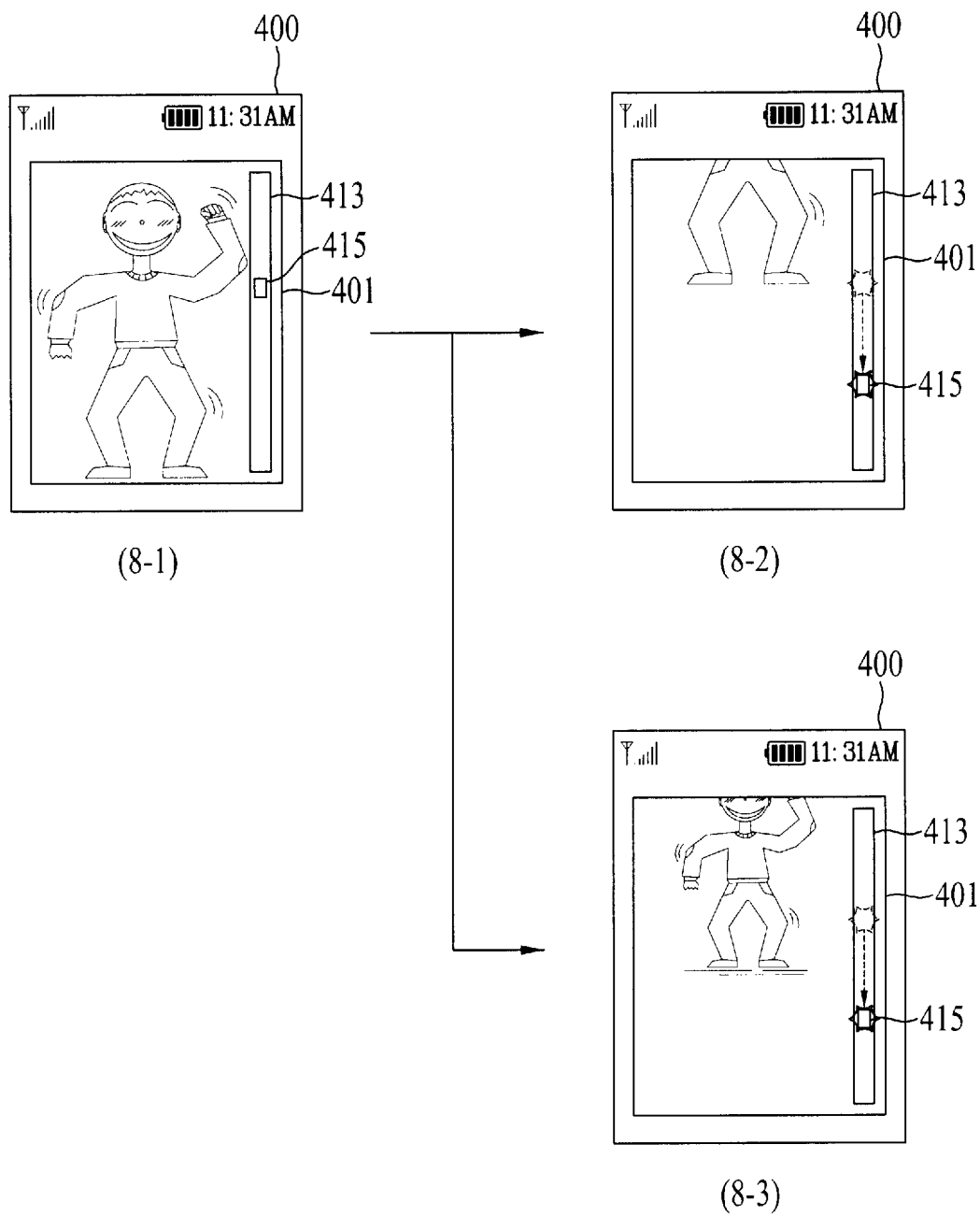

The first or second touch manipulation can be performed not only using the scroll bar 415 but also using other techniques. For example, it can be configured such that the first or second touch manipulation to be recognized when the pointer touches and then flicks the scroll region 413 to the left or right. Referring to FIG. 7B, when the pointer touches and then flicks the touchscreen to the left or right, it can be configured such that the first or second touch manipulation to be recognized when the pointer passes through any point of the scroll region 413 only without passing through the scroll bar 415.

After the image size has been enlarged or reduced by performing the first or second touch manipulation on the scroll bar 415, the image can be scrolled by performing touch and drag on the scroll bar 415 in the vertical direction. Referring to (8-1) and (8-2) of FIG. 8, the display can be configured such that the image is scrolled maintaining the enlarged or reduced image size. Alternatively, referring to (8-1) and (8-3) of FIG. 8, the display can be configured such that when the image is scrolled after the image size has been enlarged or reduced, the enlarged or reduced image size returns to its original size when the scroll bar 415 is moved in the vertical direction.

The first and second touch manipulations using the scroll region 413 are explained with reference to FIG. 9. Referring to (9-1) of FIG. 9, the image viewer 401 for viewing an image is displayed on the touchscreen 400. Within the image viewer 401, a scroll region 413 extending in vertical direction and a scroll bar 415 positioned within the scroll region 413 is displayed.

Figure 9:
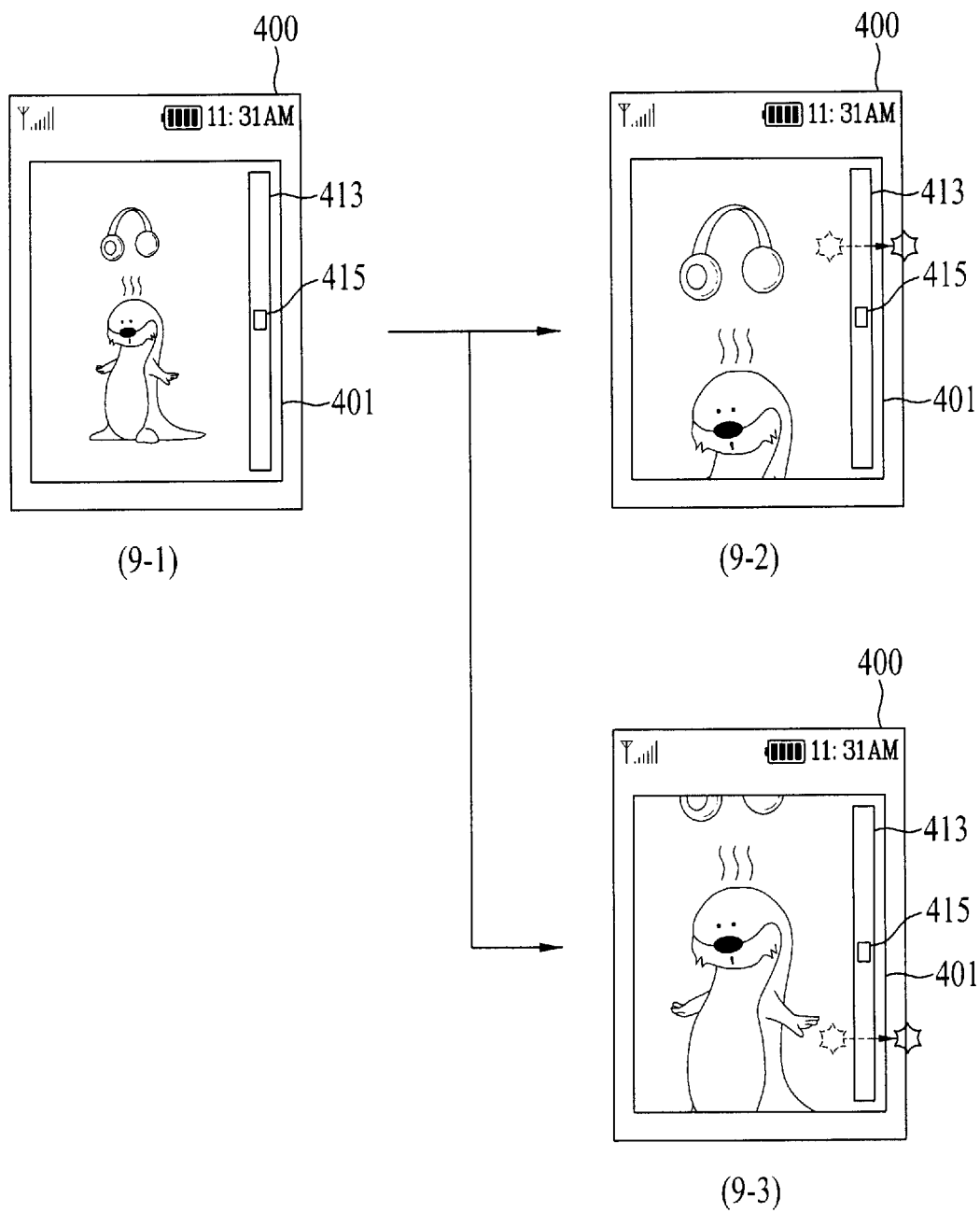

Referring to (9-2) of FIG. 9, when an upper part of the scroll region 413 is touched and flicked to the right, the image is enlarged centering on the upper part of the image or a portion of the image corresponding to the touched point of the scroll region 413. Referring to (9-3) of FIG. 9, when a lower part of the scroll region 413 is touched and flicked to the right, the image is enlarged centering on the lower part of the image or a portion of the image corresponding to the touched point of the scroll region 413. Therefore, a specific area of an image to be enlarged or reduced can be selected by performing the touch manipulation at a corresponding point of the scroll region 413.

As mentioned in the above description, while the image viewer function or a video play function is being executed in the mobile terminal 100, the image displayed on the touchscreen 400 is enlarged or reduced by the first or second touch manipulation. Alternatively, when the first or second touch manipulation is performed on the scroll bar 415, at least one portion of the image on the touchscreen may be scrolled horizontally rather than being enlarged or reduced.

When the first or second touch manipulation is performed in the course of executing a different function, at least one portion of an image, which is related to the different function and displayed on the touchscreen can be enlarged or reduced. The different function may include image thumbnail view, moving picture play, phonebook, message call history view, webpage access, text view or writing, menu list view or the like. A thumbnail of the image thumbnail view, a phone number of the phonebook, a call history of the call history view, a menu of the menu list view or the like can be generically called "object."

Figure 10:
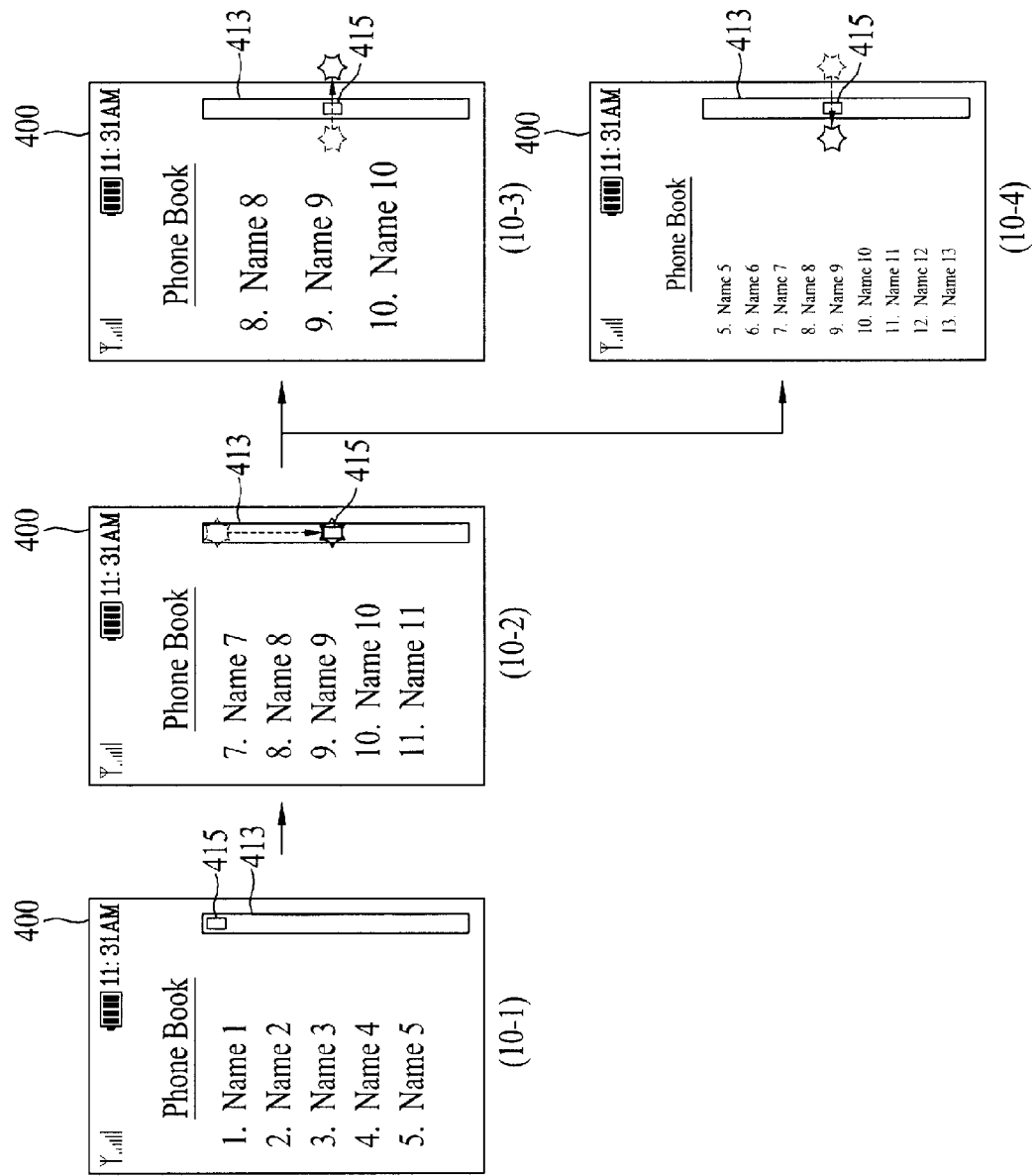

Referring to (10-1) of FIG. 10, a phonebook menu is being executed in the mobile terminal 100 and an image or correspondent party list that is relevant to the phonebook is displayed on the touchscreen 400.

Referring to (10-2) of FIG. 10, when the scroll bar 415 is touched and dragged, correspondent parties displayed on the touchscreen 400 are scrolled according to the touch and drag. For example, as shown in (10-1) and (10-2) of FIG. 10, five correspondent parties are displayed as a list.

Referring to (10-3) of FIG. 10, when a first touch manipulation, for example, from the left to the right, is performed on the scroll bar 415 or the scroll region, the view of the correspondent party list is enlarged in size. Accordingly, the characters for the correspondent parties appear enlarged and only three correspondent parties are displayed in the list due to the enlarged character size or image of the correspondent party list.

Referring to (10-4) of FIG. 10, when a second touch manipulation, for example, from the right to the left, is performed on the scroll bar 415, the view of the correspondent party list is reduced in size. Accordingly, the characters for the correspondent parties appear reduced, thus displaying more, for example, nine, correspondent parties in the list due to the reduced character size. Therefore, by performing the first or second touch manipulation on the scroll bar 415, a user is able to select the enlarged view of the correspondent party list, thus displaying a reduced number of individual correspondent parties in larger sized characters, or select the reduced view of the correspondent party list, thus displaying a greater number of individual correspondent parties in smaller sized characters.

Figure 11:
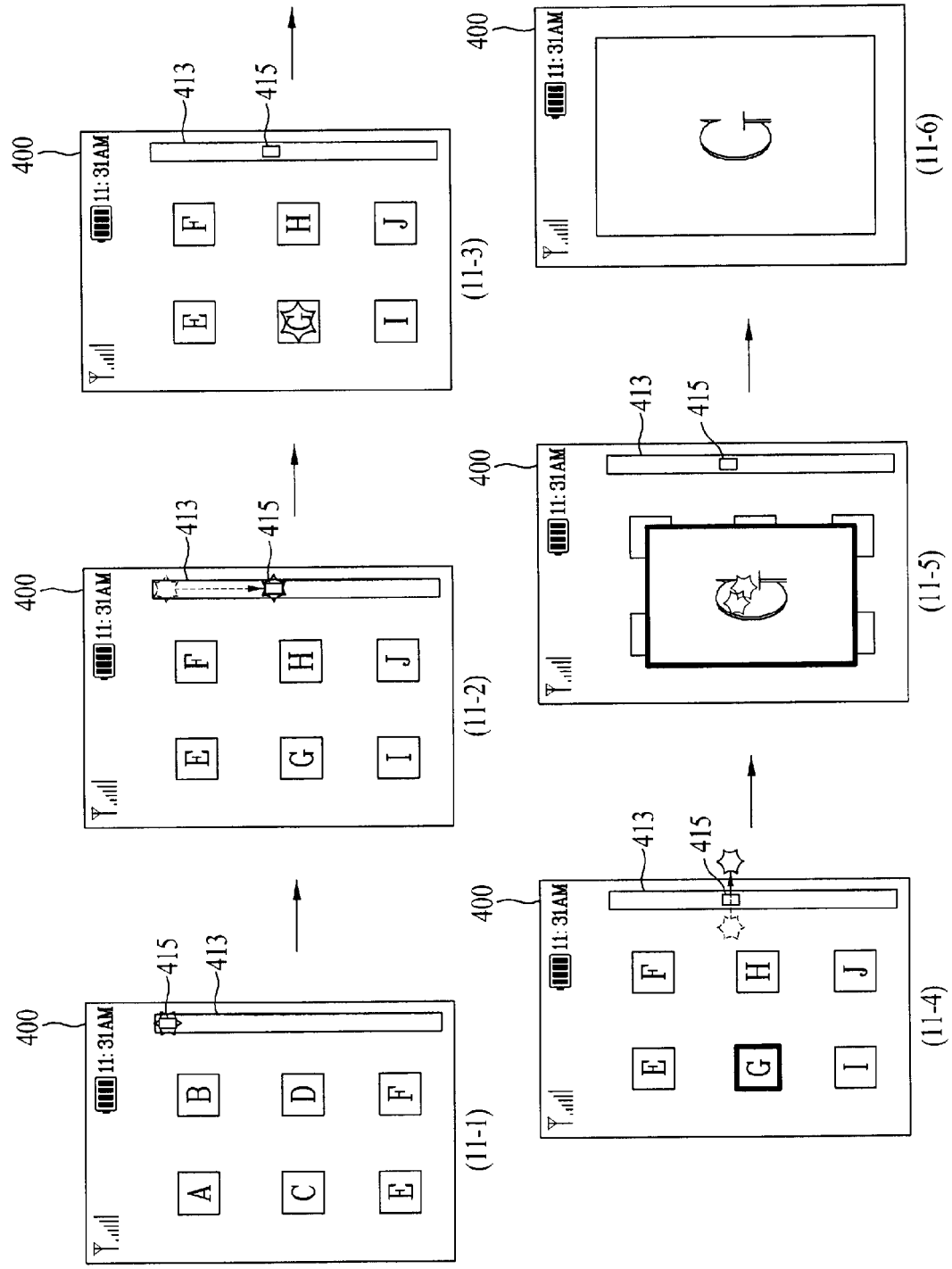

Referring to (11-1) of FIG. 11, an image thumbnail view menu is being executed in the mobile terminal 100 and image thumbnails "A"-"F" are displayed on the touchscreen 400. Referring to (11-2) of FIG. 11, when the scroll bar 415 is touched and dragged, the image thumbnails displayed on the touchscreen 400 are scrolled according to the touch and drag, thus displaying thumbnails "E"-"J."

Referring to (11-3) of FIG. 11, when the thumbnail "G" is selected from the thumbnails "E" to "J" by touching the corresponding thumbnail and releasing the touch from the corresponding thumbnail. Alternatively, the selection for the thumbnail or the release of the corresponding selection for the thumbnail can be performed by manipulating the navigation key of the user input unit 130.

Referring to (11-4) of FIG. 11, the selected thumbnail "G" can be visually distinguished from the rest of the thumbnails "E," "F," "H," "I" and "J." For example, in (11-4) of FIG. 11, the selected thumbnail "G" is visually distinguished by a bolder frame around the selected thumbnail. Subsequently, a first touch manipulation is performed on the scroll bar 415, for example, from the left to the right, as shown in (11-4) of FIG. 11.

Referring to (11-5) of FIG. 11, the size of the selected thumbnail "G" is then enlarged responsive to the first touch manipulation. Optionally, if a second touch manipulation is performed on the scroll bar 415, the selected thumbnail "G" can get smaller. If the first or second touch manipulation is performed on the scroll bar 415 when the thumbnail is not selected yet, all of the thumbnails may be enlarged or reduced.

Subsequently, double touches are performed on the enlarged thumbnail "G" to activate the thumbnail. Referring to (11-6) of FIG. 11, when the thumbnail "G" is activated, a full size image corresponding to the thumbnail "G" is displayed on the touchscreen 400, thus the rest of the thumbnails "E," "F," "H," "I" and "J" not being displayed.

In the following description, another example for the first or second touch manipulation related to the selected thumbnail is explained. Referring to (12-1) of FIG. 12, image thumbnails "E" to "J" are displayed on the touchscreen 400. And, when the thumbnail G is selected from the displayed image thumbnails, the first touch manipulation is then performed on the scroll bar 415 displayed on the touchscreen 400.

Figure 12:
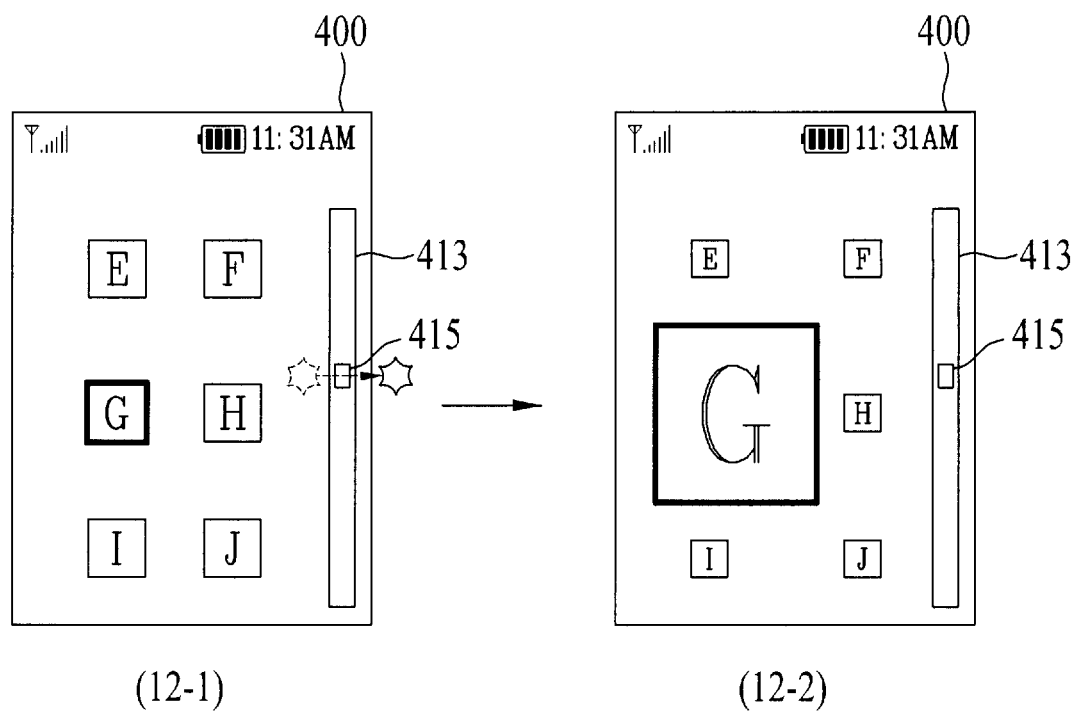

Referring to (12-2) of FIG. 12, the size of the selected thumbnail "G" becomes larger and the sizes of the rest of the thumbnails "E," "F," "H," "I" and "J" gradually become smaller as the selected thumbnail "G" becomes larger. While the size of the selected thumbnail "G" becomes larger, the remaining thumbnails are still displayed in smaller sizes.

Figure 13:
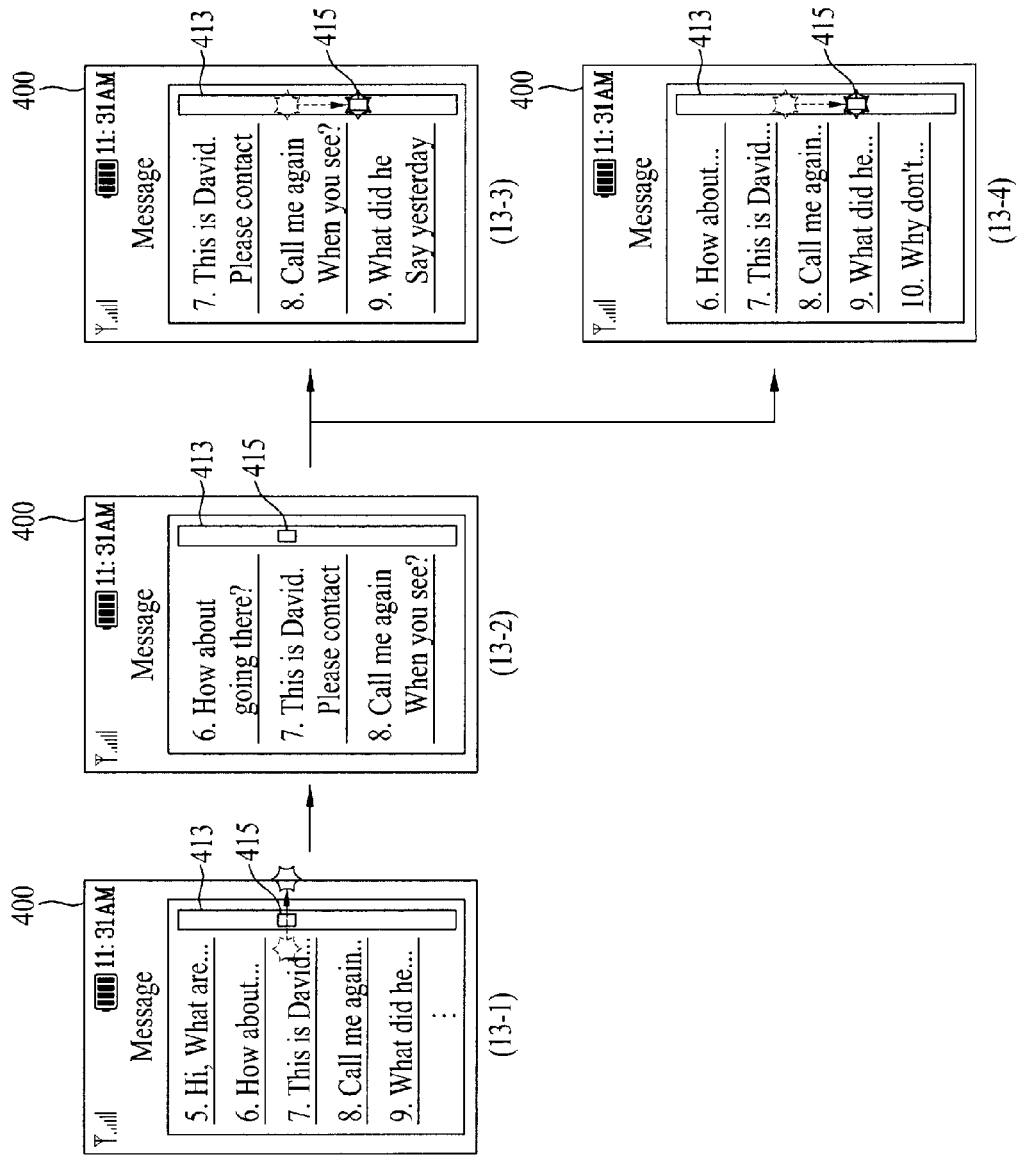

Referring to (13-1) of FIG. 13, a message menu is being executed in the mobile terminal 100 and a list of messages is displayed on the touchscreen 400. It is apparent to those skilled in the art that the messages can be scrolled though the scroll region 413 and the scroll bar 415.

Referring to (13-2) of FIG. 13, when a first touch manipulation is performed on the scroll bar 415, a list of the messages displayed becomes enlarged. For example, the list of the messages is enlarged such that font sizes of the messages become larger. Alternatively, in (13-2) of FIG. 13, more contents of a specific one of the messages can be viewed on the list while maintaining the font sizes of the messages.

Referring to (13-3) of FIG. 13, when the scroll bar 415 is touched and dragged from the top to the bottom, the messages are scrolled from the bottom to the top while maintaining the enlarged sizes of the messages. If the scroll bar 415 is touched and dragged from the bottom to the top, the messages can be scrolled from the top to the bottom while maintaining the enlarged sizes of the messages.

Alternatively, referring to (13-4) of FIG. 13, when the scroll bar 415 is scrolled, the messages are scrolled and returned to their original sizes. In one aspect, when the first or second touch manipulation is performed, all messages do not necessarily become collectively enlarged or reduced in size. This is explained in detail with reference to FIG. 14.

Referring to (14-1) of FIG. 14, a specific one of the messages is selected. The message selecting process is similar to the aforesaid thumbnail selecting process. Alternatively, as the messages are scrolled, one of the messages, for example, a message located at the top, middle or bottom part of the list, may be selected as default.

Referring to (14-2) of FIG. 14, the selected message, for example, message 7, can be visually distinguished from the rest of the messages. Subsequently, a first touch manipulation is performed on the scroll bar 415.

Referring to (14-3) of FIG. 14, only the selected message is enlarged responsive to the first touch manipulation. Similarly, if a second touch manipulation is performed on the scroll bar 415, only the selected message will be reduced in size responsive to the second touch manipulation.

Subsequently, when the scroll bar 415 is touched and scrolled from the top to the bottom, referring to (14-4) of FIG. 14, the messages are scrolled while maintaining the enlarged size of the message. Alternatively, referring to (14-5) of FIG. 14, the messages are scrolled and the enlarged message returns to its original size responsive to the touch and scroll.

In general, while at least one portion of an image on the touchscreen is enlarged or reduced when the first or second touch manipulation is performed on the scroll bar 415, a configuration for executing a different function is possible. This is explained in detail with reference to FIGS. 15 to 19.

Referring to (15-1) of FIG. 15, a message menu is being executed in the mobile terminal 100 and a list of messages is displayed on the touchscreen 400. The messages may be sorted in a vertical direction in order of reception and/or transmission time, for example. As mentioned in the foregoing description, a scroll region 413 and a scroll bar 415 are displayed on the touchscreen 400.

In each item of the list, content of the corresponding message is partially displayed or information on a recipient or sender of the message, such as name, phone number, and the like, can be displayed. In (15-1) of FIG. 15, an originator of the corresponding message is alphabetically displayed for each item of the list. A digit written next to the alphabet is provided to distinguish a plurality of messages for a single sender from each other. Subsequently, one of the messages, for example, message "4. B-2" is selected.

Referring to (15-2) of FIG. 15, the selected message can be visually distinguished from the rest of the messages. Subsequently, a first touch manipulation is performed on the scroll bar 415.

Referring to (15-3) and (15-4) of FIG. 15, as the touched message "B-2" disappears by sliding out right to left, another message "B-3" appears by sliding in. The latter message "B-3" is the message related to the touched message "B-2." For example, the related message "B-3" may include a message sent by a sender B of the touched message "B-2" before the touched message "B-2" is sent.

If one of the messages is selected in (15-1) of FIG. 15 and a second touch manipulation is performed on the scroll bar 415, as shown in (15-5) of FIG. 15, referring to (15-6) and (15-7) of FIG. 15, as the touched message "B-2" disappears by sliding out left to right, another message "B-1," which is sent by the sender B of the touched message "B-2" after the touched message "B-2" has been sent, appears by sliding in.

Figure 16A:
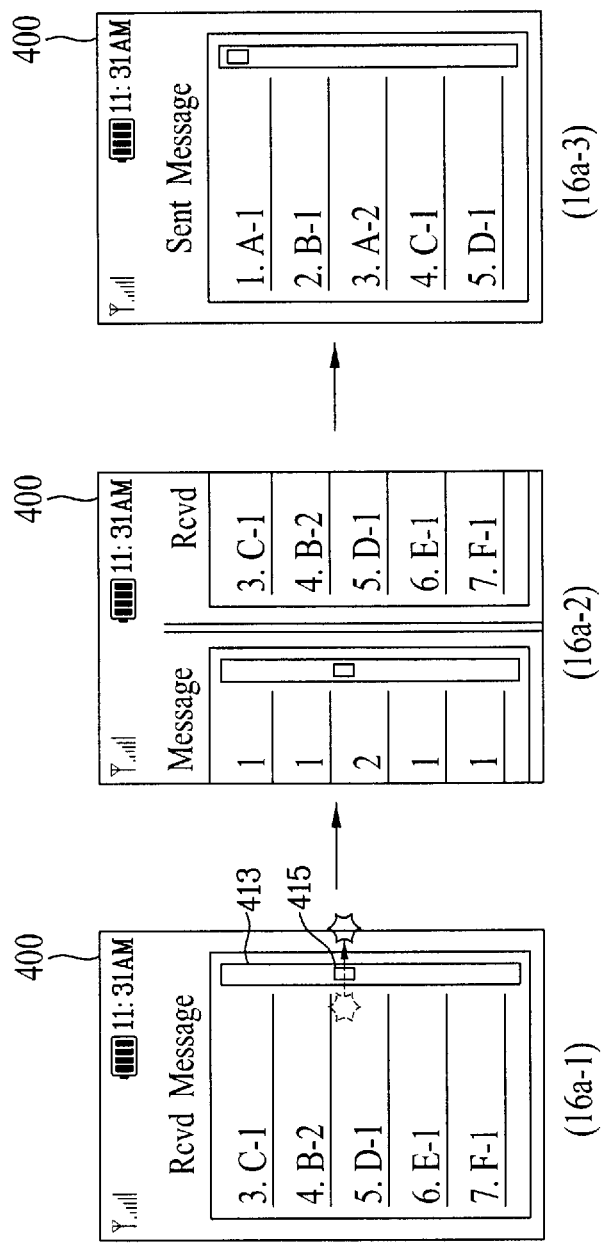

Referring to (16a-1) of FIG. 16A, when a list of received messages is displayed on the touchscreen 400, the received messages can be sorted in a vertical direction in order of reception and/or transmission time. A scroll region 413 and a scroll bar 415 are displayed on the touchscreen 400 and a first or second touch manipulation is performed on the scroll bar 415.

Referring to (16a-2) and (16a-3) of FIG. 16A, as the list of the received messages disappears by sliding out in response to the first or second touch manipulation, a list of transmitted messages appears by sliding in.

Figure 16B:
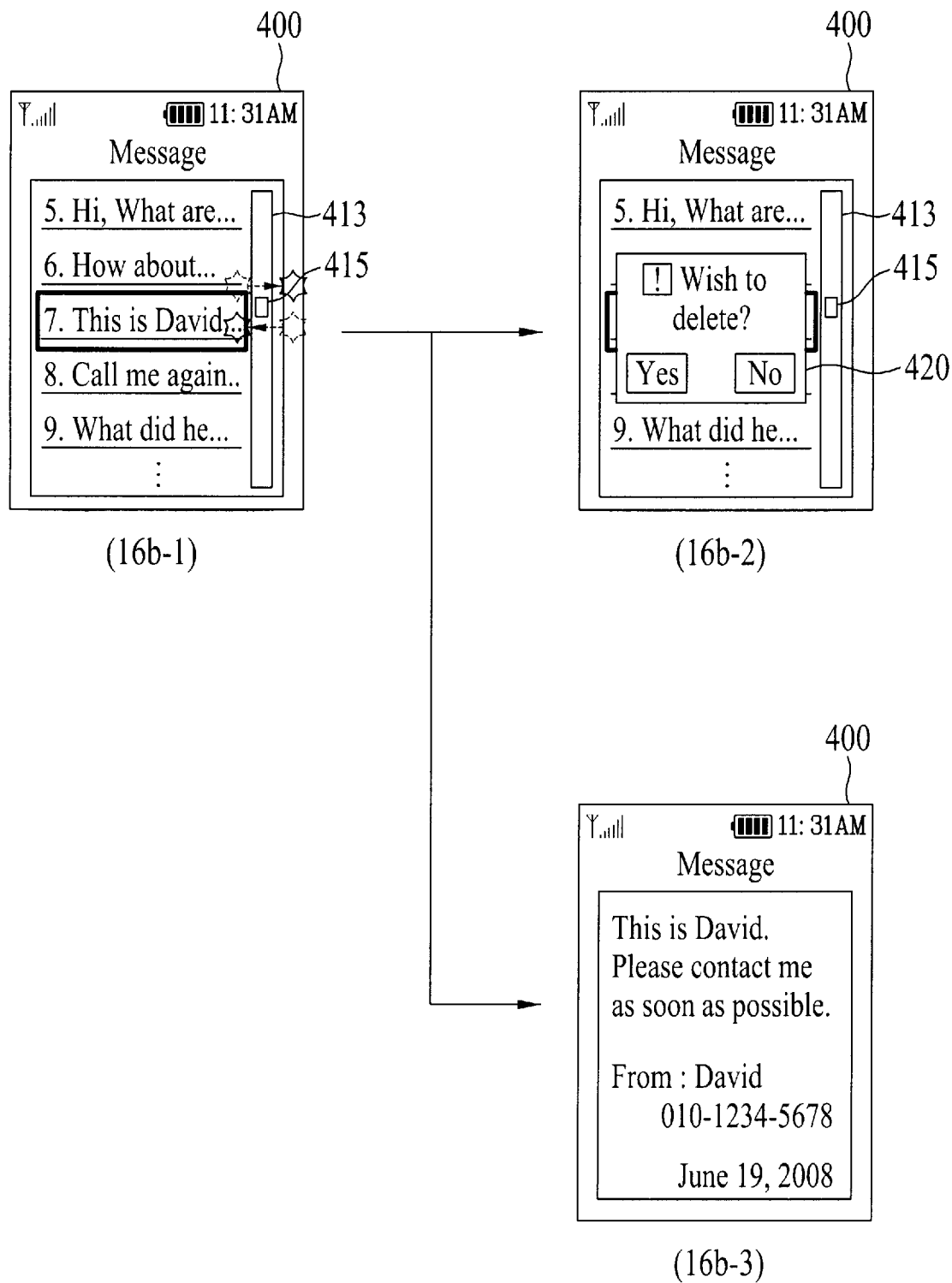

Referring to (16b-1) of FIG. 16B, when messages are displayed on the touchscreen 400 and one of the messages is selected, the selected message is visually distinguished from other messages. A scroll region 413 and a scroll bar 415 are displayed on the touchscreen 400 and first touch manipulation is performed on the scroll bar 415.

Referring to (16b-2) of FIG. 16B, a window 420 for querying whether to delete the selected message is displayed. If "Yes" is selected via the window 420, the selected message is deleted.

Referring to (16b-3) of FIG. 16B, when second touch manipulation is performed on the scroll bar 415, content of the selected message is displayed.

FIG. 13, FIG. 14, FIG. 15, FIG. 16A and FIG. 16B can each be modified and applied to a phonebook menu, a call history view menu and a menu list view menu as well as to the message menu. For example, in association with FIG. 13 and FIG. 14, the scenario for enlarging or reducing the message list entirely or in part may be modified into a scenario for enlarging or reducing the phonebook, the call history or the menu list.

Further, in association with FIG. 15, the scenario for the related message to appear by sliding can be modified into a scenario for a related correspondent party phone number, call history or menu item to appear by sliding. Furthermore, in association with FIG. 16A, the scenario for the transmitted message list to appear by sliding instead of the received message list can be modified into a scenario for a different menu to appear by sliding instead of a prescribed menu list, for example. Moreover, in association with FIG. 16B, the scenario for deleting or opening the message can be modified into a scenario for deleting a prescribed correspondent party selected from the phonebook or displaying details of the correspondent party.

Figure 17:
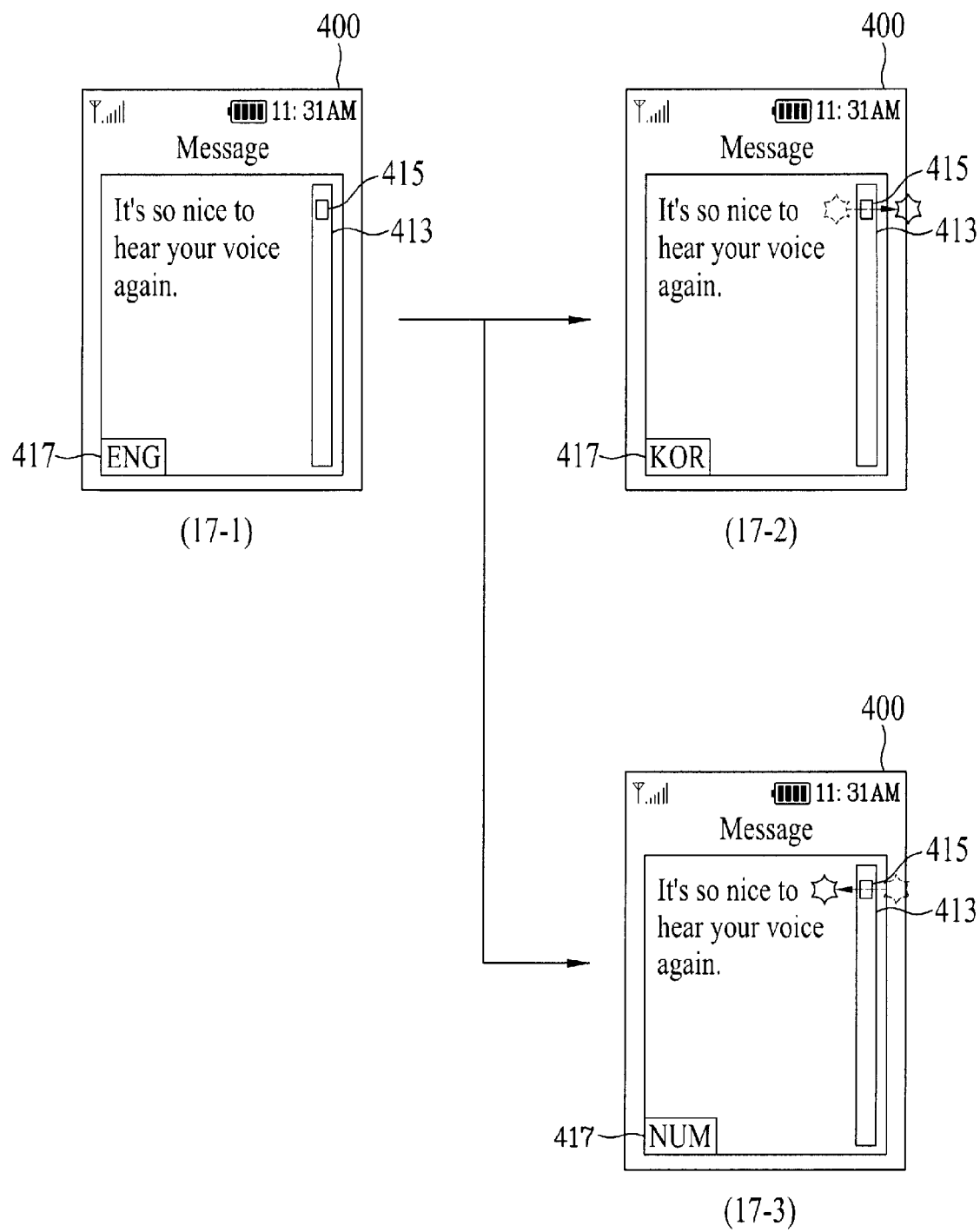

Referring to FIG. (17-1) of FIG. 17, when a message menu, in particular, a message writing menu or a text writing menu is being executed in the mobile terminal 100, input text is displayed on the touchscreen 400. A scroll region 413 and a scroll bar 415 are displayed on the touchscreen 400, and if the scroll bar 415 is scrolled within the scroll region 413 in a vertical direction, displayed input text is scrolled.

An indicator 417 indicating a type of a character to be input is displayed on the touchscreen 400. In (17-1) of FIG. 17, the indicator 417 indicates that the type of the character to be input is "English." Subsequently, referring to (17-2) of FIG. 17, when a first touch manipulation is performed on the scroll bar 415, the indicator 417 displayed on the touchscreen 400 indicates that the type of the character to be input is switched from "English" to "Korean."

Alternatively, when the indicator 417 indicates that the type of the character to be input is English in (17-1) of FIG. 17, if a second touch manipulation is performed on the scroll bar 415, as shown in (17-3) of FIG. 17, the indicator 417 displayed on the touchscreen 400 indicates that the type of the character to be input is switched from "English" into "Numeral."

Figure 18:
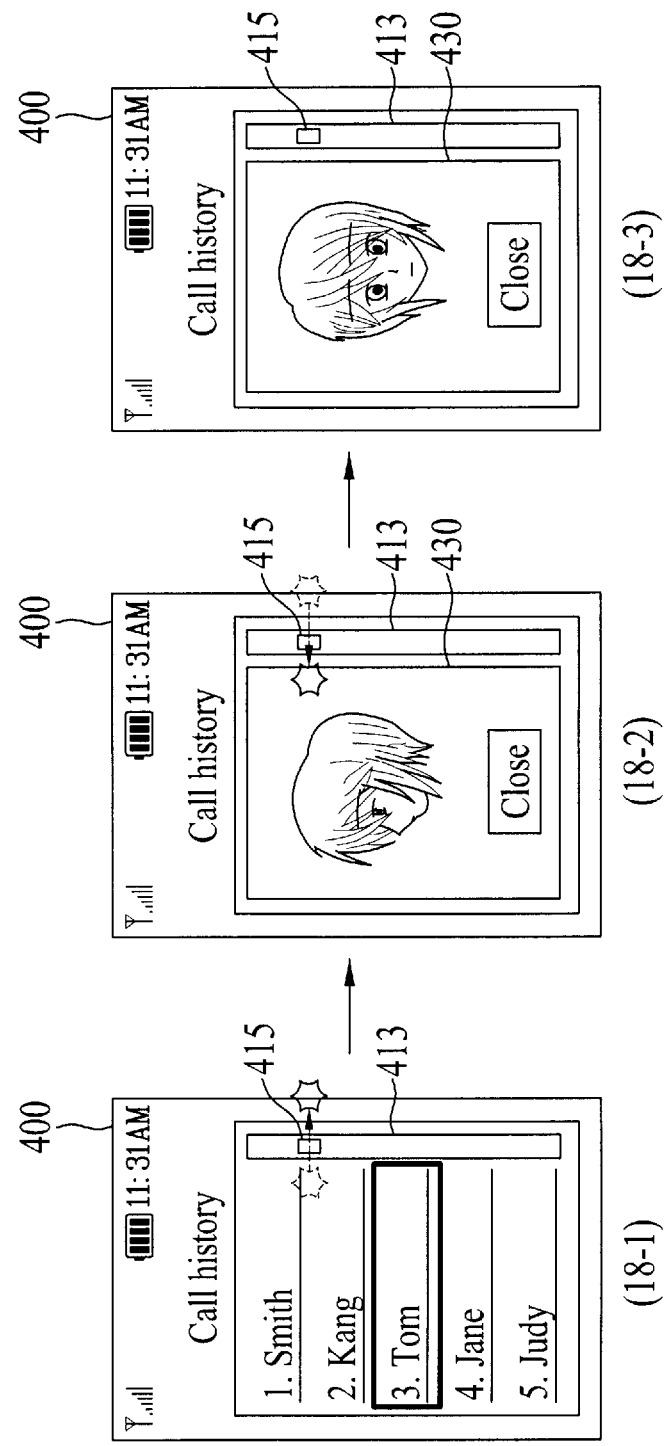

Referring to FIG. (18-1) of FIG. 18, when a call history view menu is being executed in the mobile terminal 100, call history is displayed as a list on the touchscreen 400. A scroll region 413 and a scroll bar 415 are displayed on the touchscreen 400, and if the scroll bar 415 is scrolled within the scroll region 413 in a vertical direction, the call history is scrolled.

In (18-1) of FIG. 18, when one of the call history is selected, the selected call history is visually distinguished from the rest of the call history. Referring to (18-2) and (18-3) of FIG. 18, when a first or second touch manipulation is performed on the scroll bar 415, a photo 430 relevant to the correspondent party of the selected call history, which is stored in the mobile terminal 100, is displayed on the touchscreen 400.

Figure 19:
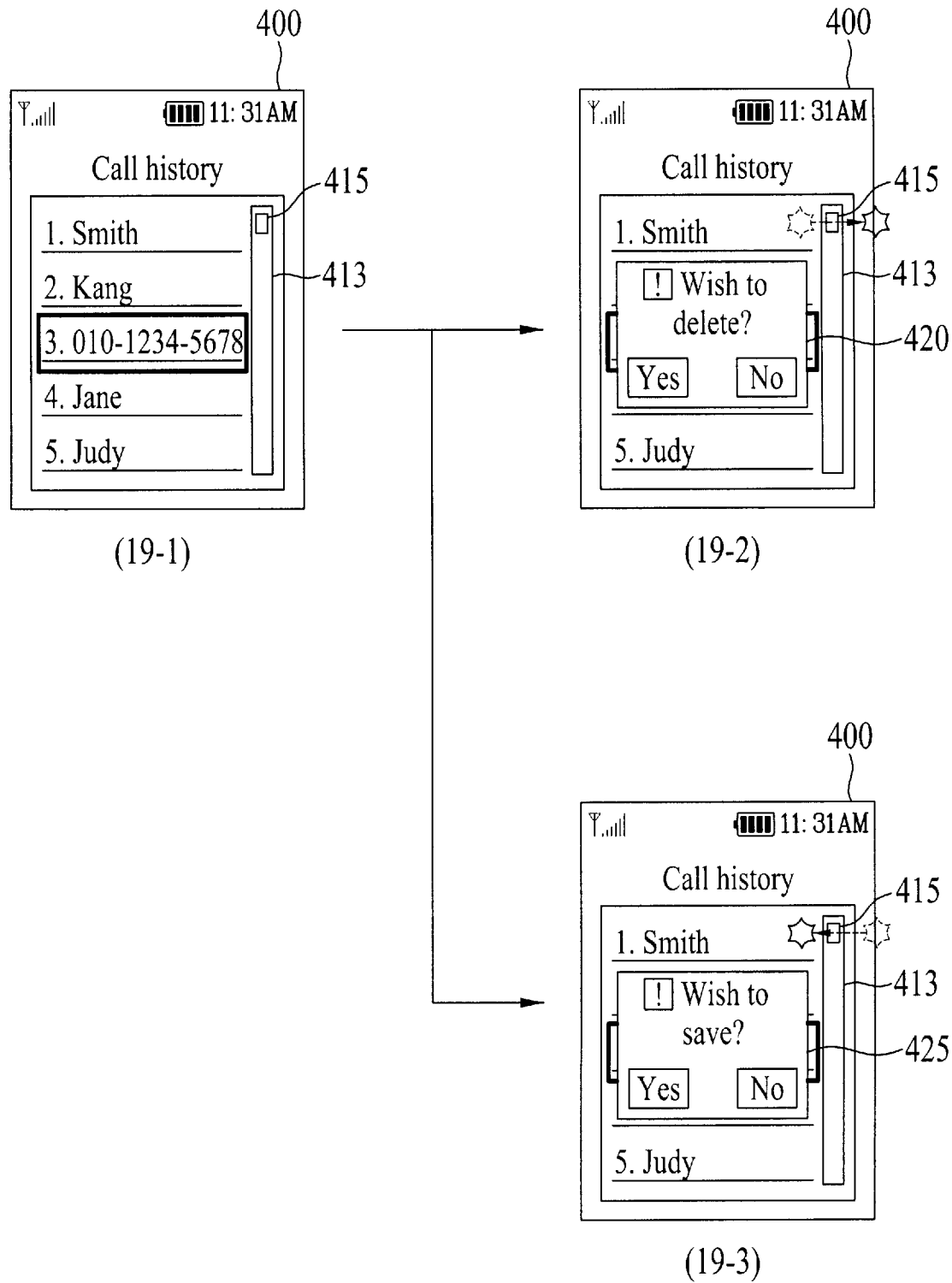

Referring to FIG. (19-1) of FIG. 19, when a call history view menu is being executed in the mobile terminal 100, call history is displayed as a list on the touchscreen 400. A scroll region 413 and a scroll bar 415 are displayed on the touchscreen 400, and if the scroll bar 415 is scrolled within the scroll region 413 in a vertical direction, the call history is scrolled. When one of the call history is selected, the selected call history is visually distinguished from the rest of the call history. In this example, since the correspondent party's information relevant to the selected call history is not stored in the phonebook, a phone number of the correspondent party is displayed unlike other call history displayed by names.

Referring to (19-2) of FIG. 19, when a first touch manipulation is performed on the scroll bar 415, a window 420 for querying whether to delete the selected call history is displayed on the touchscreen 400. Therefore, a terminal user is able to delete the selected call history by selecting "Yes" in the window 420.

Alternatively, if a second touch manipulation is performed on the scroll bar 415 before the first touch manipulation is performed on the scroll bar 415, as shown in (19-3) of FIG. 19, a window 425 for querying whether to store the selected call history in the phonebook is displayed on the touchscreen 400. Therefore, a terminal user is able to save the selected call history by selecting "Yes" in the window 425.

Figure 20:
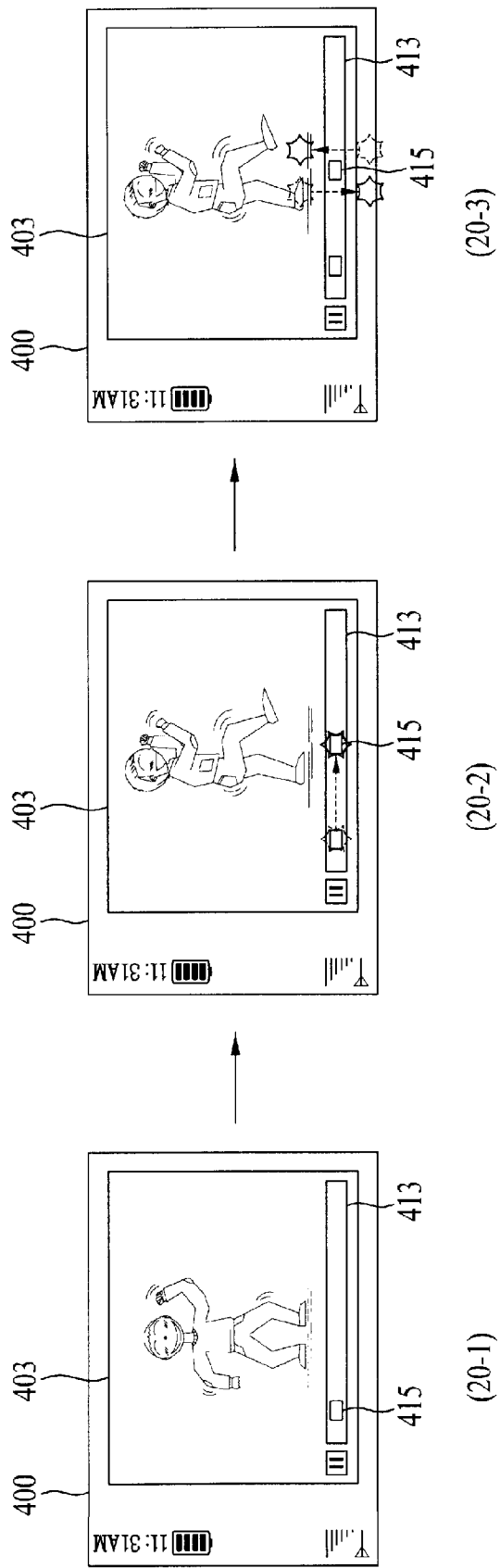

Referring to (20-1) of FIG. 20, when a moving picture play menu is being executed in the mobile terminal 100, a moving picture viewer 403 is displayed on the touchscreen 400. A scroll region 413 extending in a horizontal direction and a scroll bar 415 provided within the scroll region 413 are displayed on the moving picture viewer 403. Further referring to (20-1) and (20-2) of FIG. 20, if the scroll bar 415 is scrolled by touching and dragging in the horizontal direction, a play position of the moving picture is scrolled according to the position of the scroll bar 415.

Referring to (20-3) of FIG. 20, a first touch manipulation and a second touch manipulation can be performed on the scroll bar 415. For example, one of the first and second touch manipulations can be performed by touching and then dragging or flicking the scroll bar 415 in a downward direction. The other of the first and second touch manipulations can be performed by touching and then dragging or flicking the scroll bar 415 in an upward direction. Alternatively, one of the first and second touch manipulations may be performed by long-touching the scroll bar 415 or touching the scroll bar 415 for at least a predetermined period of time. The other of the first and second touch manipulations may be performed by tapping the scroll bar 415.

If the first and second touch manipulations are performed on the scroll bar 415, a different function associated with the moving picture play menu can be performed. For example, the different function includes enlargement or reduction of the reproduced image, volume adjustment of the moving picture, key frame shift of the played image, micro scroll adjustment of the played image and the like.

The key frame shift is explained as an example of different functions. First, at least two major key frame images of the moving picture can be set in advance when the moving picture is played back. Hence, if the first or second touch manipulation is performed on the scroll bar 415 in the course of the moving picture playback, the play position can be shifted to the next or previous key frame image that is adjacent to the current play position of the played moving picture.

Next, the micro scroll adjustment or fine adjustment is explained as an example of the different functions. If the first or second touch manipulation is performed on the scroll bar 415 in the course of the moving picture playback, the play position can be shifted by prescribed frame or time, for example 5 seconds, such that the play position of the currently played moving picture is shifted to the next or previous frame. Therefore, the micro scroll adjustment is useful for slightly changing or scrolling the play position relative to the current moving picture play position.

FIG. 21 shows that a webpage browsing function is being executed in the mobile terminal 100. When a webpage is displayed in the mobile terminal 100, as mentioned in the foregoing description, if the first or second touch manipulation is performed on the scroll bar 415, the webpage is enlarged or reduced. Alternatively, when the first or second touch manipulation is performed on the scroll bar 415, an operation other than enlarging or reducing the webpage may be executed as described below.

Referring to (21-1) of FIG. 21, when a web browser is displayed on the touchscreen 400, a webpage accessed via the wireless communication unit 110 is displayed on the web browser 405. A specific image 405-1 of the webpage may be selected by touching the specific image on the webpage or an image located at a specific position of the web browser may be selected as default.

Referring to (21-2) of FIG. 21, when the scroll bar 415 is touched and then dragged in a downward direction in the scroll region 413, the webpage is scrolled upward. After the scrolling of the webpage, a different image 405-2 is selected.

Referring to (21-3) of FIG. 21, when a first touch manipulation is performed on the scroll bar 415, only the selected different image 405-2 is enlarged while the remaining portions of the webpage are maintained in the same size. In particular, the different image 405-2 can be enlarged in proportion to an extent of the first touch manipulation. Alternatively, if a second touch manipulation is performed on the scroll bar 415, the selected different image 405-2 may be reduced in size.

Referring to (21-4) of FIG. 21, when the scroll bar 415 is touched and then dragged in an upward direction, the different image 405-2 returns to its original size and the webpage is scrolled downward or to the original position. Alternatively, the webpage can be scrolled maintaining the enlarged size of the different image 405-2.

Alternatively to enlarging or reducing at least one portion of the webpage in response to the first or second touch manipulation on the scroll bar 415, when the first or second touch manipulation is performed on the scroll bar 415, the image of the web browser may move to a previous or next webpage relative to the currently displayed webpage. Alternatively, the webpage may be scrolled to the left or right when the first or second touch manipulation is performed on the scroll bar 415.

Figure 22:
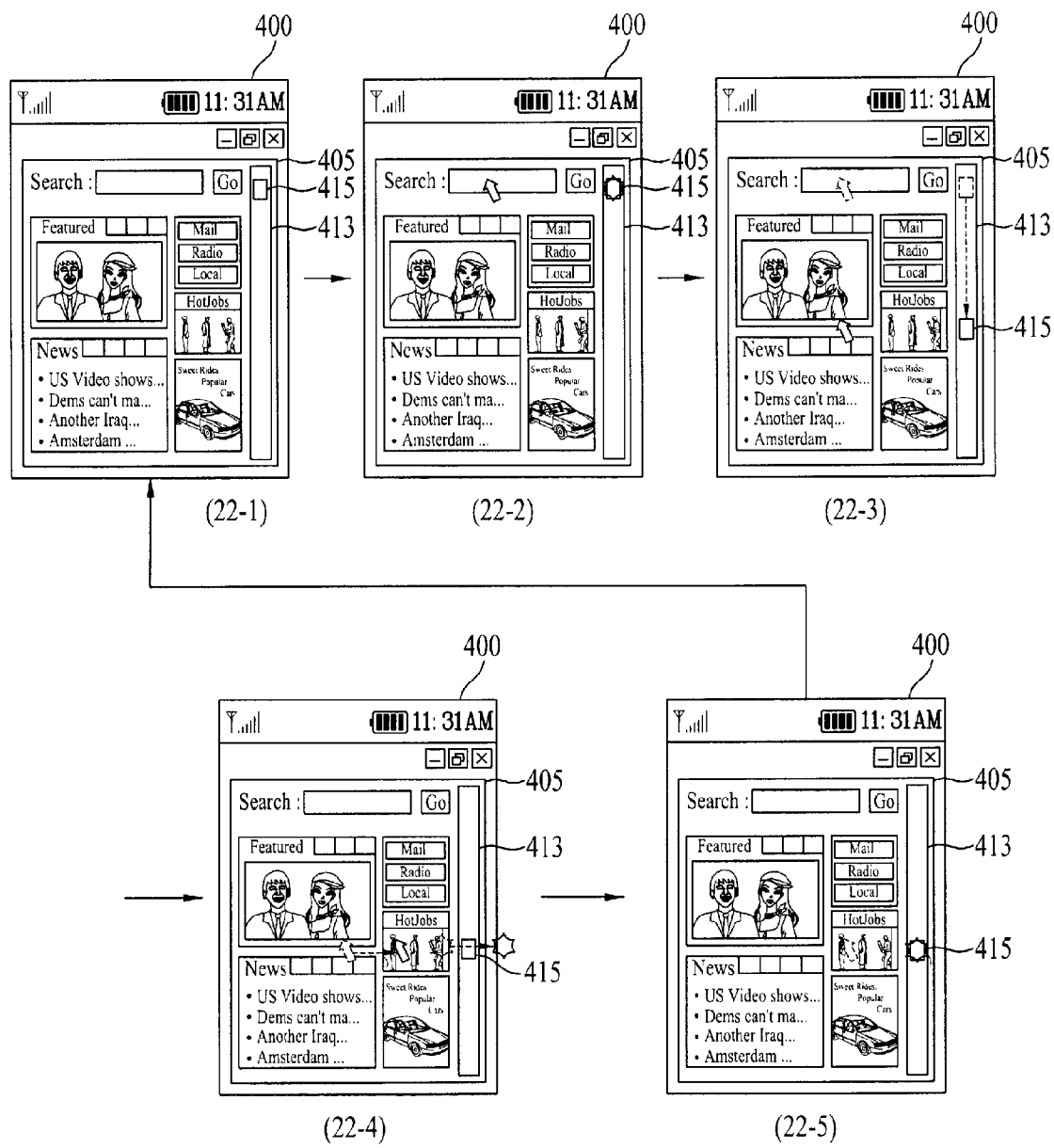

Referring to (22-1) of FIG. 22, when a web browser 405 is displayed on the touchscreen 400, a webpage accessed via the wireless communication unit 110 is displayed on the web browser 405. A scroll region 413 and a scroll bar 415 are also displayed on the touchscreen 400.

Referring to (22-2) of FIG. 22, a cursor is generated on the webpage in response to a predefined manipulation of the user input unit 140. Alternatively, the cursor may be generated when an icon for the cursor generation provided on the touchscreen 400 is touched. Alternatively, the cursor can be generated by double-clicking the scroll bar 405.

Referring to (22-3) of FIG. 22, when the scroll bar 415 is touched and dragged in a downward direction, the cursor moves down according to the dragging of the scroll bar 415 instead of scrolling the webpage because the cursor is generated and displayed on the webpage. Moreover, if the scroll bar 415 is touched and dragged in an upward direction, the cursor moves upward.

Referring to (22-4) of FIG. 22, when a first touch manipulation is performed on the scroll bar 415, the cursor is shifted from the left to the right. Alternatively, if a second touch manipulation is performed on the scroll bar 415, the cursor can be shifted from the right to the left.

Referring to (22-5) of FIG. 22, the cursor disappears. The cursor may disappear when the scroll bar 415 is tapped or double-clicked. After the cursor has disappeared, if the scroll bar 415 is touched and dragged in a vertical direction, the webpage is scrolled in the vertical direction as well.

Figure 23:
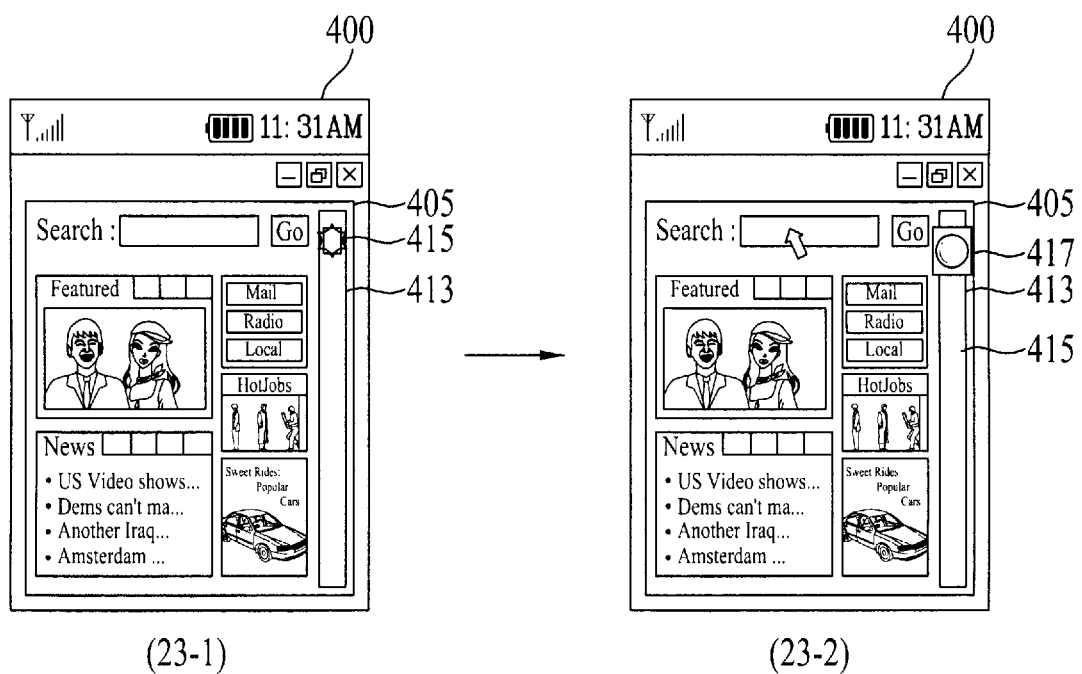

Referring to (23-1) of FIG. 23, when a web browser 405 is displayed on the touchscreen 400, a webpage accessed via the wireless communication unit 110 is displayed on the web browser 405. A scroll region 413 and a scroll bar 415 are also displayed on the touchscreen 400.

Referring to (23-2) of FIG. 23, a cursor and a touch input device, for example, a virtual trackball, for shifting the cursor are generated on the webpage. The cursor and the touch input device may be generated in response to a predefined manipulation of the user input unit 140. Alternatively, the cursor and the touch input device may be generated when an icon for the cursor and touch input device generation provided on the touchscreen 400 is touched. Alternatively, the cursor and the touch input device may be generated by double-clicking the scroll bar 405.

The touch input device 417 is generated and positioned on the scroll bar 415. If the touch input device 417 includes the virtual trackball, it is apparent to those skilled in the art that the cursor can be shifted by rolling the virtual trackball up, down, right and left.

Figure 24:
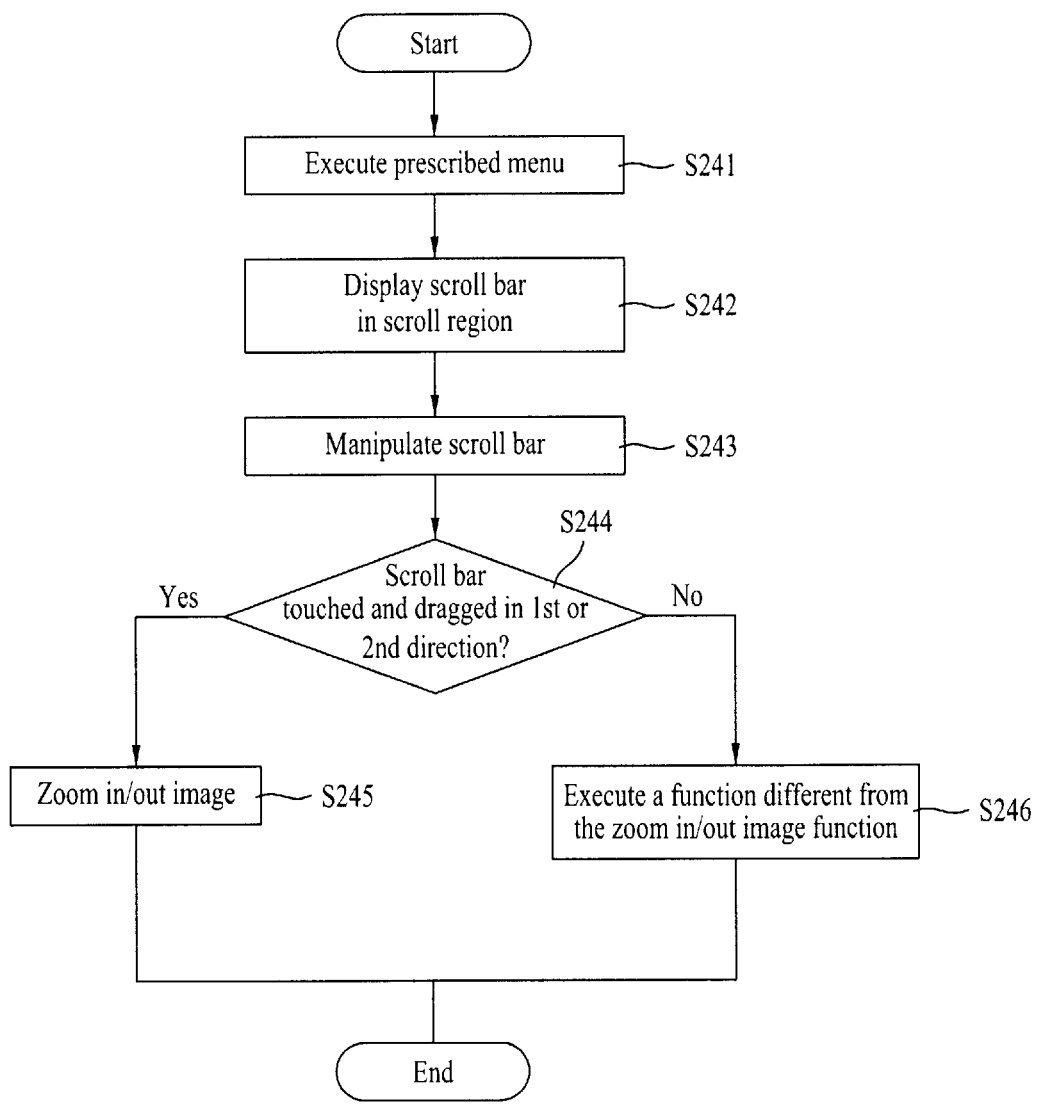
FIG. 24 is a flowchart illustrating controlling a mobile terminal according to another embodiment of the present invention.

In the following description, a method of controlling a mobile terminal according to an embodiment of the present invention is explained with reference to FIGS. 24 to 26. FIG. 24 illustrates controlling a mobile terminal 100 according to an embodiment of the present invention. Referring to FIG. 24, when a prescribed menu is executed (S241), the display 151 displays a scroll bar in a scroll region displayed on the display (S242).

When the scroll bar is manipulated (S243), if the scroll bar is touched and dragged in a first direction (S244), an image displayed on the display 151 is zoomed in or out responsive to the touching and dragging of the scroll bar (S245). If the scroll bar is touched and dragged in a second direction (S244), a function that is different from the function of zooming in or out of the image is executed responsive to the touch and dragging of the scroll bar in the second direction (S246).

FIG. 25 and FIG. 26 are diagrams of a display screen on which a method of controlling a mobile terminal according to an embodiment of the present invention is implemented. Referring to (25-1) of FIG. 25, when a photographing menu is being executed in the mobile terminal 100, a preview image for photographing is displayed on the touchscreen 40. A scroll region 413 extending in a vertical direction and a scroll bar 415 provided within the scroll region 413 are also displayed on the touchscreen 400. A focus zone indicator 419 is displayed on the preview image. The focus zone indicator 419 is provided to display a zone that is focused when taking a picture through the camera module 121 in the mobile terminal 100. In (25-1) of FIG. 25, the focus zone indicator 419 is focused on a left object of two objects within the preview image.

Referring to (25-2) of FIG. 25, when the scroll bar 415 is touched and dragged in an upward direction, the preview image is enlarged. Alternatively, when the scroll bar 415 is touched and dragged in a downward direction, the preview image may be reduced.

Referring to (25-3) of FIG. 25, when a first or second touch manipulation is performed on the scroll bar 415, the focus zone indicator 419 is shifted to a right one of the two objects within the preview image. Therefore, a terminal user can easily have a specific object focused to take a picture.

When the first and second touch manipulations are performed on the scroll bar 415, rather than adjusting the focus zone as exemplified above, an exposure adjustment, a brightness adjustment, a flash on/off selection, a selection for photographed picture storage or the like may be performed.

Referring to (26-1) of FIG. 26, when a broadcast menu is being executed in the mobile terminal 100, a received broadcast image is displayed on the touchscreen 40. A scroll region 413 extending in a vertical direction and a scroll bar 415 provided within the scroll region 413 are also displayed on the touchscreen 400. Moreover, information about a currently received channel, for example, "CH 34," is displayed on a portion of the touchscreen 400.

Referring to (26-2) of FIG. 26, when the scroll bar 415 is touched and dragged in an upward direction, the broadcast image is enlarged. Alternatively, when the scroll bar 415 is touched and dragged in a downward direction, the broadcast image may be reduced.

Referring to (26-3) of FIG. 26, when a first or second touch manipulation is performed on the scroll bar 415, the received broadcast channel is switched to a different channel, for example, from "CH 34" to "CH 35." Moreover, a volume of the received broadcast channel can be adjusted.

In summary, embodiments of the present invention provide considerably expanding the practical use of a scroll bar displayed on a touchscreen compared to a conventional scroll bar. A conventionally scroll bar is generally manipulated only in a horizontal or vertical direction to be moved in a scroll region, but not in both the horizontal and vertical directions. In contrast, some implementations allow for the scroll bar to be manipulated in at least four directions including the vertical and horizontal directions. Thus, by manipulating the scroll bar in various ways, a terminal user is able to select a specific function or menu in association with various functions and menus provided to a terminal.

It will be apparent to those skilled in the art that the present invention can be specified into other forms without departing from the spirit or scope of the inventions. For example, the aforesaid phone number or correspondent party of phonebook, call history, message, thumbnail and the like can be generically called objects differing from each other in types. The practical use of the scroll bar for the object in one of the aforesaid types can be applied to the object in the different type. For example, adjustment of the number of thumbnail type objects displayed on a single image using the scroll bar can be applied to the adjustment of the number of different type objects, such as phone number object, call history object, message object, and the like, displayed on a single image.

In addition, the aforesaid "touch" term includes either a contact touch or a proximity touch. Moreover, a touch and drag action may be replaced by a flick action.

Further, the above-described methods can be implemented in a program recorded medium as computer-readable codes. The computer-readable media include all kinds of recording devices in which data readable by a computer system are stored. The computer-readable media include ROM, RAM, CD-ROM, magnetic tapes, floppy discs, optical data storage devices, and the like for example and also include carrier-wave type implementations such as transmission via the Internet. The computer can include the controller 180 of the terminal.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile terminal comprising:
   a touchscreen configured to display:
      a scroll region having a scroll bar; and
      movement of the scroll bar within the scroll region,
   wherein the scroll region is designated at a partial portion of a view displayed on the touchscreen and extends in a first direction such that the scroll bar is movable in the first direction along the scroll region; and
   a controller configured to perform at least one function in response to a first touch input received at the scroll bar,
   wherein the first touch input comprises:
      a first touch action comprising moving the scroll bar in the first direction from a first position within the scroll region to a second position within the scroll region; or
      a second touch action received in a second direction that is different from the first direction, the second touch action comprising a dragging action received via at least a portion of the scroll bar in the second direction, and
   wherein the controller is further configured to perform:
      a first function in response to the first touch action, the first function comprising scrolling the displayed view according to the movement of the scroll bar;
      a second function in response to the second touch action, the second function comprising controlling a size of the displayed view; and
      at least one function in response to a second touch input received at the scroll region,
   wherein:
      the second touch input comprises a third touch action received in the second direction, the third touch action comprising a dragging action received via at least a portion of the scroll region other than the scroll bar;
      a size of a specific portion of the displayed view is controlled when the third touch action is applied at a specific portion of the scroll region corresponding to the specific portion of the displayed view;
      an upper portion of the displayed view is resized when the third touch action is applied across an upper portion of the scroll region corresponding to the upper portion of the displayed view; and
      a lower portion of the displayed view is resized when the third touch action is applied across a lower portion of the scroll region corresponding to the lower portion of the displayed view.

2. The mobile terminal of claim 1, wherein the first direction is a vertical direction when the second direction is a horizontal direction.

3. The mobile terminal of claim 1, wherein the displayed view is resized responsive to the second touch action and returns to its original size when the first touch action is subsequently applied after the second touch action.

4. The mobile terminal of claim 1, wherein the second touch action further comprises:

touching at least a first point located at one side of the scroll region;
dragging across the scroll bar within the scroll region from the touched at least first point;
continuing the dragging to a second point located at a second side of the scroll region; and
completing the dragging at the second point,
wherein:
   the scroll region is located between the first point and the second point, and
   the first point, the scroll bar, and the second point are on a substantially straight line that can be formed in the second direction.

5. The mobile terminal of claim 4, wherein the second touch action further comprises touching the first point, the scroll bar, and the second point sequentially in order.

6. The mobile terminal of claim 1, wherein the scroll region is displayed near one side of the touchscreen.

7. The mobile terminal of claim 1, wherein the first direction and the second direction cross each other and the first function is switched to the second function when the second touch action is received following the first touch action.

8. The mobile terminal of claim 1, wherein the first touch action further comprises moving the scroll bar in response to continuous contact with a pointer that is used to deliver the touch input.

9. The mobile terminal of claim 1, wherein the displayed view is related to a still picture view menu and the controller is further configured to:
   display at least two thumbnail-type images on the touchscreen; and
   control a size of at least one of the at least two thumbnail-type images in response to the second touch action.

10. The mobile terminal of claim 9, wherein the controller is further configured to activate the at least one of the at least two thumbnail-type images when the at least one of the at least two thumbnail-type images is selected by the first touch input.

11. The mobile terminal of claim 10, wherein the activated at least one of the at least two thumbnail-type images is enlarged.

12. The mobile terminal of claim 1, further comprising a wireless communication unit, wherein the displayed view is a webpage and the controller is further configured to:
   generate a cursor on the webpage in response to a predefined input; and
   move the cursor in the first direction according to a moving direction of the scroll bar when the scroll bar is touched and dragged in the first direction while the cursor is displayed on the touchscreen.

13. The mobile terminal of claim 1, wherein the scroll bar is not movable in the second direction.

14. The mobile terminal of claim 1, wherein the first direction is a horizontal direction when the second direction is a vertical direction.

15. The mobile terminal of claim 1, wherein the first direction is substantially perpendicular to the second direction.

16. A method of controlling a device comprising a touchscreen, the method comprising:
   performing a first function in response to a first touch action, wherein the touchscreen displays a scroll region having a scroll bar that is sized to be in contact with or close to two sides of the scroll region, the scrolling region is designated substantially at a side portion of a view displayed on the touchscreen and extends in a first direction, the first function comprises scrolling the displayed view, and the first touch action comprises moving the scroll bar in the first direction within the scroll region along the two sides;

performing a second function in response to a second touch action comprising a touch action in a second direction that is different from the first direction, the second function comprising controlling a size of the displayed view, wherein:

at least the first function or the second function is performed in response to a first touch input received at the scroll bar, the first touch input comprises:

the first touch action causing movement of the scroll bar in the first direction along the two sides of the scroll region from a first position to a second position; and the second touch action comprising a dragging action received at least at a third position within the scroll region and at a fourth position outside the scroll region such that the scroll bar stays at a substantially same position as the third position within the scroll region during the dragging action; and performing at least one function in response to a second touch input received at the scroll region, wherein:

the second touch input comprises a third touch action received in the second direction, the third touch action comprising a dragging action received via at least a portion of the scroll region other than the scroll bar in the second direction;

a size of a specific portion of the displayed view is controlled when the third touch action is applied at a specific portion of the scrod region corresponding to the specific portion of the displayed view;

an upper portion of the displayed view is resized when the third touch action is applied across an upper portion of the scroll region corresponding to the upper portion of the displayed view; and a lower portion of the displayed view is resized when the third touch action is applied across a lower portion of the scroll region corresponding to the lower portion of the displayed view.

17. The method of claim 16, wherein the first direction and the second direction cross each other and the first function is switched to the second function when the second touch action is received following the first touch action.

18. The method of claim 17, wherein the second touch action follows the first touch action such that the second function is performed at the scrolled view of the touchscreen.

19. The method of claim 18, wherein:

the third position corresponds to a position of the scroll bar, the second touch action further comprises dragging across the scroll bar toward a fifth position outside the scroll region such that the second action is completed at the fifth position, and the scroll region is located between the fourth position and the fifth position.

20. A method of controlling a mobile terminal, the method comprising:

displaying a scroll region extending in a first direction and a scroll bar provided within the scroll region on a touchscreen of the mobile terminal;

scrolling an image displayed on the touchscreen when the scroll bar is touched and dragged in the first direction along the scroll region or in a second direction that is opposite to the first direction such that movement of the scroll bar within the scroll region according to the dragging is displayed while the scroll bar is dragged; and executing a function related to controlling a size of the displayed image when at least the scroll region is touched and then dragged in a third direction or a fourth direction that is opposite to the third direction, the third direction and the fourth direction being substantially perpendicular with respect to the first direction and the second direction, wherein:

the scroll bar is movable in the first direction or the second direction in response to the dragging in the first direction or the second direction;

the scroll bar is not movable in the third direction or the fourth direction in response to the dragging in the first direction, second direction, third direction or fourth direction;

a size of a specific portion of the displayed image is controlled in response to the dragging in the third direction or the fourth direction that is applied at a specific portion of the scroll region corresponding to the specific portion of the displayed image;

an upper portion of the displayed image is resized when the dragging in the third direction or the fourth direction is applied across an upper portion of the scroll region corresponding to the upper portion of the displayed image; and a lower portion of the displayed image is resized when the dragging in the third direction or the fourth direction is applied across a lower portion of the scroll region corresponding to the lower portion of the displayed image.

* * * * *